(12) United States Patent
Persaud et al.

(10) Patent No.: US 11,290,436 B2
(45) Date of Patent: Mar. 29, 2022

(54) MECHANISM FOR ENCRYPTION KEY DISTRIBUTION IN COMPUTER NETWORKS

(71) Applicant: Cisco Technology, Inc., San Jose, CA (US)

(72) Inventors: Dave Persaud, San Jose, CA (US); Xueqiang Ma, Sunnyvale, CA (US); Kalyan K. Ghosh, Saratoga, CA (US); Kondal R. Boreddy, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 16/249,785

(22) Filed: Jan. 16, 2019

(65) Prior Publication Data
US 2020/0099672 A1 Mar. 26, 2020

Related U.S. Application Data

(60) Provisional application No. 62/734,813, filed on Sep. 21, 2018.

(51) Int. Cl.
*H04L 29/06* (2006.01)
*H04L 9/08* (2006.01)

(52) U.S. Cl.
CPC .......... *H04L 63/062* (2013.01); *H04L 9/0822* (2013.01); *H04L 9/0861* (2013.01); *H04L 63/065* (2013.01)

(58) Field of Classification Search
CPC ... H04L 9/3252; H04L 9/3033; H04L 9/3242; H04L 9/3265; H04L 63/062;
(Continued)

(56) References Cited

U.S. PATENT DOCUMENTS

| 7,089,211 | B1 * | 8/2006 | Trostle | H04L 9/0833 |
| | | | | 705/51 |
| 8,347,376 | B2 * | 1/2013 | Weis | H04L 63/062 |
| | | | | 726/15 |

(Continued)

OTHER PUBLICATIONS

Release Notes: Junos® OS Release 14.2R8 for the EX Series, M Series, MX Series, PTX Series, T Series, and Junos Fusion Dec. 28, 2017, 343 pages.

(Continued)

*Primary Examiner* — Catherine Thiaw
(74) *Attorney, Agent, or Firm* — Patterson + Sheridan, LLP

(57) ABSTRACT

Techniques for key distribution are provided. A first symmetric key is generated for a first downstream site, and a second symmetric key is generated for a second downstream site. The first symmetric key is transmitted to the first downstream site, and the second symmetric key is transmitted to the second downstream site. Upon receiving an indication that the first symmetric key was successfully deployed at the first downstream site, the first symmetric key is deployed on a first network node of an upstream site. Finally, upon determining that the second symmetric key was not successfully deployed at the second downstream site, techniques include refraining from deploying the second symmetric key to a second network node of the upstream site, where the second network node continues to communicate with the second downstream site using an original symmetric key.

20 Claims, 12 Drawing Sheets

(58) Field of Classification Search
CPC ... H04L 9/0822; H04L 9/0861; H04L 63/065; H04L 9/0833
See application file for complete search history.

(56) References Cited

U.S. PATENT DOCUMENTS

| | | | |
|---|---|---|---|
| 9,178,807 B1 | 11/2015 | Chua et al. | |
| 9,465,947 B2 | 10/2016 | Nakhjiri | |
| 9,882,714 B1* | 1/2018 | Cignetti | H04L 9/088 |
| 10,169,119 B1* | 1/2019 | Snyder | G06F 11/004 |
| 2002/0154781 A1* | 10/2002 | Sowa | H04L 63/062 |
| | | | 380/278 |
| 2003/0044020 A1* | 3/2003 | Aboba | H04L 63/04 |
| | | | 380/278 |
| 2011/0150223 A1* | 6/2011 | Qi | H04L 9/0816 |
| | | | 380/273 |
| 2014/0115325 A1* | 4/2014 | Detienne | H04L 63/0209 |
| | | | 713/160 |
| 2015/0156181 A1* | 6/2015 | Kerberg | H04L 63/068 |
| | | | 726/6 |
| 2017/0026349 A1 | 1/2017 | Smith et al. | |
| 2018/0109372 A1 | 4/2018 | Fu | |
| 2019/0245687 A1* | 8/2019 | Ja | H04L 63/065 |
| 2020/0295927 A1* | 9/2020 | Grupeli | H04L 9/0833 |

OTHER PUBLICATIONS

Anna Selvag Braadland, "Key Management for Data Plane Encryption in SDN Using WireGuard," Norwegian University of Science and Technology, Jun. 2017, 112 pages.

Sabrina Dubroca, MACsec: a different solution to encrypt network traffic, Redhat.com/blog, Oct. 14, 2016, 16 pages.

Fabio Martignon, Stefano Paris, Antonio Capon, "DSA-Mesh: a Distriubted Secuirty Architecuture for Wireless Mesh Networks," Wiley Onine Library, Feb. 22, 2011, 15 pages.

* cited by examiner

MECHANISM FOR ENCRYPTION KEY DISTRIBUTION IN COMPUTER NETWORKS

CROSS-REFERENCE TO RELATED APPLICATIONS

This application claims benefit of U.S. provisional patent application Ser. No. 62/734,813, filed Sep. 21, 2018. The aforementioned related patent application is herein incorporated by reference in its entirety.

TECHNICAL FIELD

Embodiments presented in this disclosure generally relate to key distribution in computer networks. More specifically, embodiments disclosed herein relate to distributing encryption keys among distributed or multi-cloud network topologies.

BACKGROUND

Multi-cloud based network deployments have become increasingly common and accepted. Generally, a multi-cloud deployment involves distributed data processing, where end points and/or workloads are spread across one or more clouds or physical sites. Often, there is a need to secure the network traffic passing between the end points across the cloud. This requires a secure and efficient method of key distribution between the sites. Typical solutions utilize a transmission key and a reception key to encrypt and decrypt data, respectively. Existing methods of key distribution typically transmit a new key to all downstream sites simultaneously, and wait for each site to successfully deploy the new key. If the deployment fails at any site, the re-key process is abandoned, and the sites continue to utilize the old key until the next re-key attempt. This all-or-nothing approach can lead to security problems when a single site prevents the rest of the network from updating its security settings.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
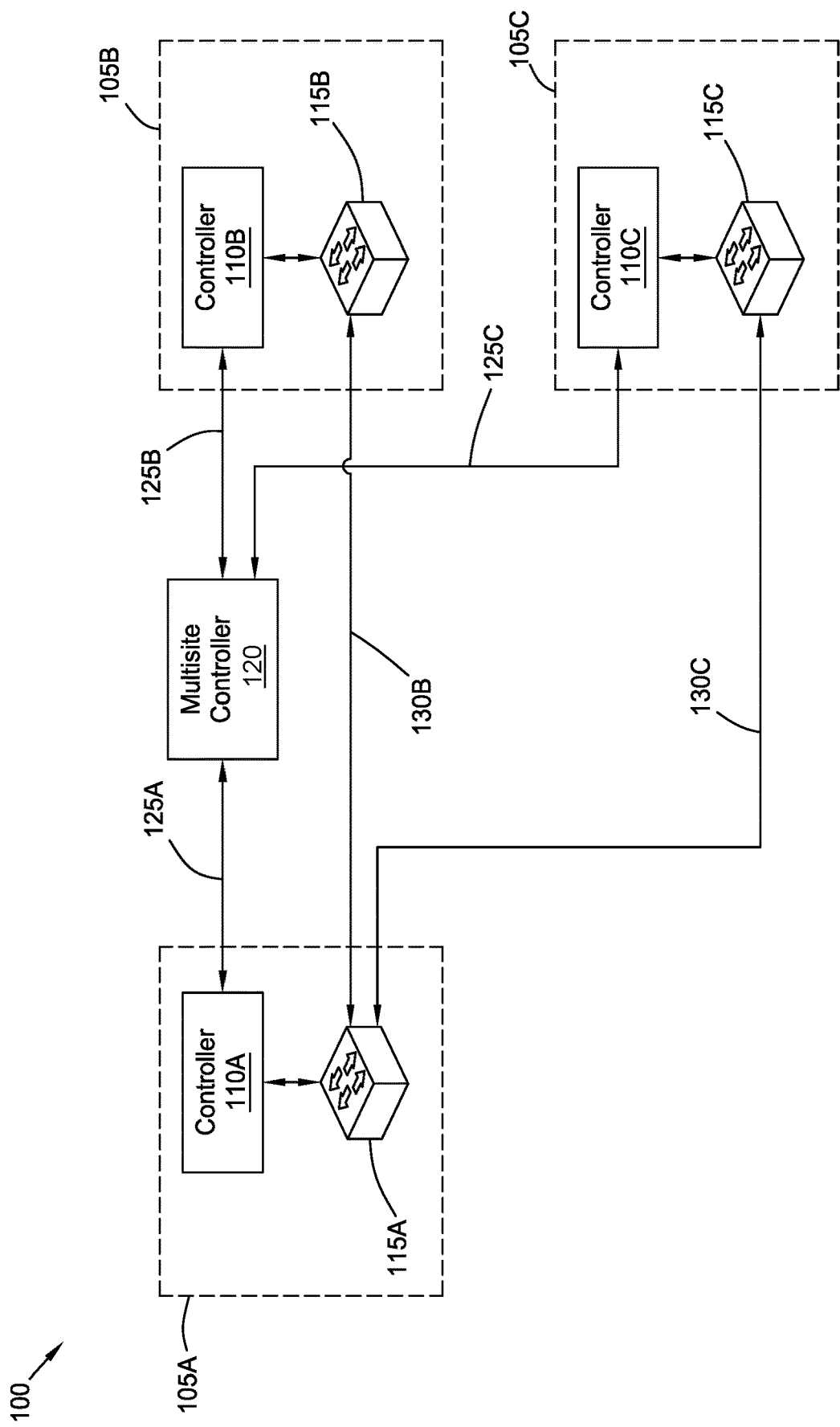
FIG. 1 illustrates a multi-cloud system that utilizes efficient key distribution, according to one embodiment disclosed herein.

One embodiment presented in this disclosure provides a method. The method includes generating a first symmetric key for a first downstream site and a second symmetric key for a second downstream site. The method further includes transmitting the first symmetric key to the first downstream site, and transmitting the second symmetric key to the second downstream site. Further, upon receiving an indication that the first symmetric key was successfully deployed at the first downstream site, the method includes deploying the first symmetric key on a first network node of an upstream site. Additionally, upon determining that the second symmetric key was not successfully deployed at the second downstream site, the method includes refraining from deploying the second symmetric key to a second network node of the upstream site, wherein the second network node continues to communicate with the second downstream site using an original symmetric key.

A second embodiment presented in this disclosure provides a network controller comprising one or more computer processors and a memory containing a program which when executed by the one or more computer processors performs an operation. The operation includes generating a first symmetric key for a first downstream site and a second symmetric key for a second downstream site. The operation further includes transmitting the first symmetric key to the first downstream site, and transmitting the second symmetric key to the second downstream site. Further, upon receiving an indication that the first symmetric key was successfully deployed at the first downstream site, the operation includes deploying the first symmetric key on a first network node of an upstream site. Additionally, upon determining that the second symmetric key was not successfully deployed at the second downstream site, the operation includes refraining from deploying the second symmetric key to a second network node of the upstream site, wherein the second network node continues to communicate with the second downstream site using an original symmetric key.

A third embodiment presented in this disclosure provides a computer product comprising logic encoded in a non-transitory medium, the logic executable by operation of one or more computer processors to perform an operation. The operation includes generating a first symmetric key for a first downstream site and a second symmetric key for a second downstream site. The operation further includes transmitting the first symmetric key to the first downstream site, and transmitting the second symmetric key to the second downstream site. Further, upon receiving an indication that the first symmetric key was successfully deployed at the first downstream site, the operation includes deploying the first symmetric key on a first network node of an upstream site. Additionally, upon determining that the second symmetric key was not successfully deployed at the second downstream site, the operation includes refraining from deploying the second symmetric key to a second network node of the upstream site, wherein the second network node continues to communicate with the second downstream site using an original symmetric key.

Example Embodiments

In distributed network embodiments that require key distribution, existing systems utilize an all-or-nothing approach where a new key is deployed to all of the physical sites simultaneously. If any site fails to implement the key, the rekey process is aborted for all other sites, and the nodes continue to communicate with the old key. This failure can cause significant security concerns. For example, a malicious party could inject a single failure into a single site, and thereby cause the rekey process to be halted for the entire topology across all sites. Further, even in the absence of malicious intent, the protocol may fail to bootstrap due to malfunction at a single site, causing disruption across all sites.

Moreover, utilizing existing techniques, the probability that the rekey process will fail increases with scale, as more sites are added to the topology. Thus, large scale deployments may be impractical, as every site in the network must operate perfectly in order to ensure the rekey process completes. Additionally, as scale increases, recovery consumes increasing amounts of time, as sequential or parallel failures in differing sites become more common. Further, existing solutions do not account for a failure to deploy the new key in the upstream site (e.g., on one or more nodes in the upstream site). Thus, there is a need for more efficient and reliable key distribution.

Embodiments of the present disclosure provide techniques for efficient and scalable key distribution by utilizing independent encryption keys for each downstream site. In an embodiment, deployment of a particular new key at the upstream site depends on the status of the particular downstream site. Thus, if one or more sites fail to successfully deploy their respective new keys, the remaining sites and the upstream sites can continue to function with the new keys while the problematic sites operate using the old keys until they can be corrected. Advantageously, the techniques disclosed herein provide deterministic results that scales easily as sites are added, because failure is limited to the particular site(s) or nodes where the failure occurred.

FIG. 1 illustrates a multi-cloud system 100 that utilizes efficient key distribution, according to one embodiment disclosed herein. In the illustrated embodiment, three Sites 105A, 105B, and 105C are communicatively coupled. Although illustrated as direct links, in embodiments, the Sites 105 communicate via one or more networks. In some embodiments, the network is a public network. In one embodiment, the Sites 105 communicate via the Internet. In the illustrated embodiment, the Sites 105B and 105C are not directly communicatively connected. However, in embodiments, the Sites 105B and 105C can be connected. Further, in embodiments, each Site 105 can have any number of connections to any number of other nodes, devices, sites, routers, switches, workloads, databases, and the like.

In the illustrated embodiment, each Site 105 includes a respective Controller 110 and Network Node 115. Although the illustrated embodiments includes a single Network Node 115 in each Site 105, each Network Node 115 is intended to represent any number of nodes, switches, routers, or gateways within each site. As illustrated, the Network Nodes 115 in each Site 105 are controlled by a respective Controller 110. That is, the Network Node(s) 115A are controlled via the Controller 110A, the Network Node(s) 115B are controlled via the Controller 110B, and the Network Node(s) 115C are controlled via the Controller 110C. In an embodiment, the Controllers 110 and Network Nodes 115 utilize software-defined networking (SDN). In embodiments, the Network Nodes 115 in each Site 105 can be arranged into any topology. For example, in one embodiment, one or more of the Sites 105 may utilize a leaf-spine topology, with one or more Network Nodes 115 acting as leaves, and one or more Network Nodes 115 acting as spines.

In embodiments, the Network Nodes 115 can be any network node, including routers, switches, gateways, and the like. Further, in embodiments, each Network Node 115 can represent a physical device, a virtual device, or a combination of physical and virtual components. In one embodiment, the Controllers 110 control the functionality and forwarding of their respective Network Nodes 115 via policies. Although the illustrated embodiment includes a single Controller 110 in each Site 105, in some embodiments, multiple Controllers 110 can jointly control the operations of Network Nodes 115 as a cluster of Controllers 110 within the Site 105.

In the illustrated embodiment, each Controller 110 is communicatively coupled with a Multisite Controller 120 via a respective Control Link 125. In some embodiments, the Multisite Controller 120 can control at least some aspects of each Controller 110 (and thus of each Network Node 115). Further, in some embodiments, each Controller 110 can communicate with other Controllers 110 associated with other Sites 105 via the Multisite Controller 120. As illustrated, the Network Node(s) 115A are coupled with the Network Nodes 115B and 115C via respective Data Links 130B-C. That is, in the illustrated embodiment, the Network Node 115A can send and receive data packets to and from the Network Nodes 115B and 115C via one or more networks (e.g., the Internet). In some embodiments, applications, virtual machines, workloads, and the like can be executed by one or more Sites 105. For example, if an application at Site 105A needs to interact with another workload at Site 105B (e.g., as part of a distributed processing operation), the Network Nodes 115A and 115B can send packets back and forth, as needed.

In one embodiment, the Site 105A operates as an upstream site, and sends data to Sites 105B and 105C, which operate as downstream sites. As used herein, "upstream site" refers to the datacenter or Site 105 that acts as the origin for packets in a processing workflow, while the "downstream site" refers to a datacenter or Site 105 acting as the recipient. In embodiments, each Site 105 can operate as both an upstream site and a downstream site, depending on the particular implementation and topology. For example, the Site 105B can act as a downstream site with respect to a first operation from the Site 105A, and as an upstream site with respect to a different operation.

In embodiments, in order to provide secure data transfers between the Sites 105, the data is encrypted prior to transmitting it out of the origin Site 105, and decrypted upon receipt at the target Site 105. In existing deployments, the upstream Site 105 uses a single key for all outgoing packets, regardless of the particular downstream Site 105 they are destined for. As discussed above, this can be problematic, as a failure to rekey a single Site 105 causes all other Sites 105 to be forced to continue to use the old key. As such, embodiments of the present disclosure enable a site-specific key to be used for each downstream Site 105, such that a failure at a single Site 105 does not impact other Sites 105.

In one embodiment, the Controller 110A of the upstream Site 105A generates a unique key for each downstream Site 105B and 105C. In some embodiments, asymmetric keys are used. In such an embodiment, the upstream Controller 110A generates a key that it will use for encryption, referred to as a TX key, as well as a different key to be used by the downstream Sites 105B and 105C for decryption, referred to as an RX key. In such an embodiment, the Controller 110A then transmits each respective RX key to the respective downstream Controller 110B and 110C. In some embodiments, the Controller 110A utilizes symmetric keys. In an embodiment, a symmetric key is a key that can be used to both encrypt data, as well as to decrypt the data. In such an embodiment, the respective symmetric keys for each Site 105A-C act as both the TX key and the RX key.

In some embodiments, the Controller 110A transmits the keys to the Controllers 110B and 110C via the Multisite Controller 120. In an embodiment, the respective Controllers 110B and 110C then implement the respective key by reconfiguring their respective Network Nodes 115B and 115C. In some embodiments, a key encryption key (KEK) is used to encrypt the key(s) sent to the downstream Sites 105B and 105C. In one embodiment, the Multisite Controller 120 generates a unique KEK for each Site 105A-C, and transmits it to the respective Controller 110A-C. When the upstream Controller 110A prepares to transmit a newly generated RX key (or symmetric key) to a respective downstream Site 105B-C, the Controller 110A encrypts it using its site-specific KEK. The Controller 110A then transmits the encrypted RX key to the Multisite Controller 120.

Upon receiving the encrypted key, the Multisite Controller 120 decrypts it based on the Site 105A-C it was received from. That is, the Multisite Controller 120 retrieves the KEK associated with the origin Site 105A-C, and decrypts the RX key. In embodiments, similarly to the TX/RX keys, the KEK can be symmetric or asymmetric. In some embodiments, the Multisite Controller 120 then determines which downstream Site 105A-C the RX key is being transmitted to, and retrieves the corresponding KEK. The Multisite Controller 120 then encrypts the RX key and transmits it to the downstream Site 105A-C. Upon receiving the encrypted RX key, the Controller 110 decrypts it using its unique KEK. Further, in an embodiment, the downstream Controller 110 then reconfigures one or more local Network Nodes 115 to use the new RX key.

In some embodiments, upon successfully deploying the new RX key (or failing to successfully deploy the new RX key), the Controller 110B-C transmits an indication of the successful or failed deployment back to the upstream Controller 110A through the Multisite Controller 120. In some embodiments, this indication is also encrypted using the respective KEK keys, as discussed above. In an embodiment, upon receiving a successful confirmation, the upstream Controller 110A identifies one or more local Network Nodes 115A that interact with the corresponding downstream Site 105B-C, and reprograms them based on the new key. In this way, the rekey process is completed separately for each downstream Site 105, and a failure to rekey one site does not affect other sites. For example, suppose Site 105A communicates with Site 105B via a first key, and 105C via a second key. After the rekey process, the Sites 105B and 105C are to utilize a third key and a fourth key, respectively. If the Site 105B fails the rekey, it continues to utilize the first key. However, the Site 105C can upgrade to the new fourth key, without delay or interruption.

Figure 2:
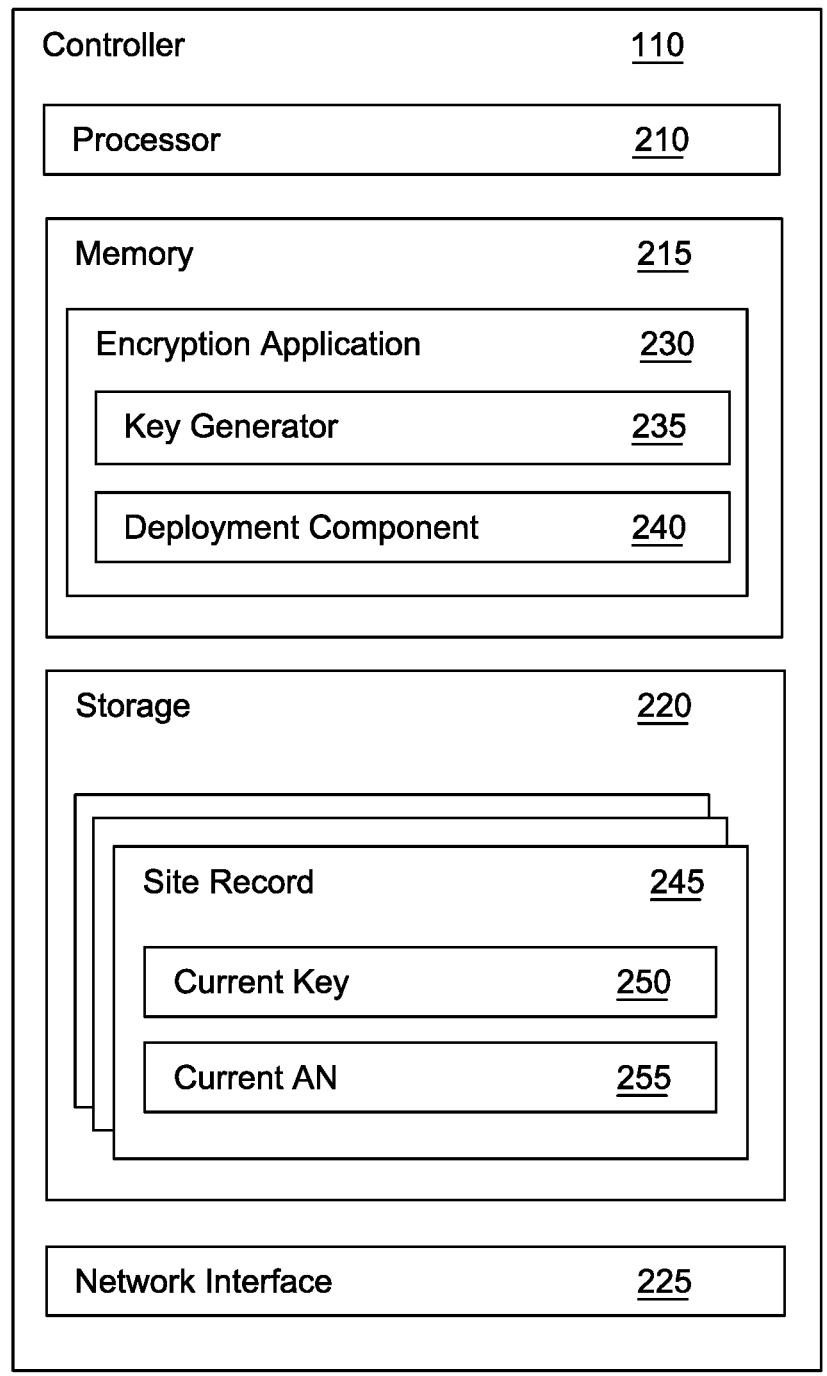
FIG. 2 is a block diagram illustrating a controller configured to provide efficient key distribution, according to one embodiment disclosed herein.

FIG. 2 is a block diagram illustrating a Controller 110 configured to provide efficient key distribution, according to one embodiment disclosed herein. In the illustrated embodiment, the Controller 110 may be located in an upstream Site 105 or a downstream Site 105. As illustrated, the Controller 110 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Controller 110 can be communicatively coupled with other devices, such as Network Nodes 115, network nodes, Multisite Controllers 120, databases, other Controllers 110, user terminals, and the like.

In the illustrated embodiment, the Memory 215 includes an Encryption Application 230, which includes a Key Generator 235 and a Deployment Component 240. In an embodiment, the Key Generator 235 determines whether one or more predefined criteria are satisfied, such that a rekey (or an initial keying) should be completed. For example, in one embodiment, the Sites 105 are periodically rekeyed based on a user-configured time period. In the illustrated embodiment, the Key Generator 235 generates a new TX/RX key set (or a symmetric key) for each Site 105 that is downstream from the Site 105 the Controller 110 controls. Further, in the illustrated embodiment, the Deployment Component 240 transmits the new key to the downstream site, and receives the indication as to whether the operation succeeded or failed. If the rekey succeeded, in an embodiment, the Deployment Component 240 deploys the new key to the relevant local switches as well.

Further, if the Controller 110 is in a downstream Site 105 with respect to one or more processes, the Deployment Component 240 receives new RX keys from the upstream Site(s) 105, and deploys them on the local Network Nodes 115. In an embodiment, the Deployment Component 240 further transmits the indication of success or failure to the upstream Site(s) 105. In this way, the Controller 110 can act as an upstream or downstream Controller 110, depending on the particular network topology.

In the illustrated embodiment, the Storage 220 includes a Site Record 245 for each other Site 105 that the Site 105 belonging to the Controller 110 interacts with. That is, in an embodiment, the Site Records 245 include records for each upstream Site 105, as well as each downstream Site 105, with respect to the Controller 110. In an embodiment, each Site Record 245 includes an indication as to the Current Key 250 associated with the relevant site, as well as the Current Association Number (AN) 255 for the site. For example, in an embodiment, upon receiving confirmation that the rekey of a particular downstream Site 105 was successful, the Deployment Component 240 updates the corresponding Site Record 245 based on the new Current Key 250. Similarly, in embodiments, upon receiving and successfully implementing a new key from an upstream Site 105, the Deployment Component 240 updates the corresponding Site Record 245 to indicate the new Current Key 250 and Current AN 255.

In embodiments, the Site Records 245 can also include an indication as to the corresponding Site 105. In some embodiments, each Site Record 245 also includes information about when the Site 105 was last rekeyed. Further, in one embodiment, the Site Record 245 includes the immediately prior key (e.g., the key that the Current Key 250 replaced), as well as the immediately prior AN. In some embodiments, when a new packet is received at a Network Node 115 of the Site 105, the node determines the origin site and AN of the packet, compares it with these stored Site Records 245, and retrieves the appropriate key for decryption. In some embodiments, the Network Nodes 115 store similar Site Records 245 locally, rather than accessing them from the Controller 110. Further, in some embodiments, the Site Records 245 also store additional older keys and ANs. For example, in one embodiment, each Site Record 245 includes an indication of the previous four keys, along with their respective ANs.

In an embodiment, the Current AN 255 is used to identify the Current Key 250 for the remote Site 105. In an embodiment, the Current AN 255 is a single bit (e.g., one or zero), and is set by the Key Generator 235 when generating a new key. In one embodiment, during the keying process, the new key is associated with an AN, and is transmitted to the downstream controller. In some embodiments, the downstream controller reconfigures its switches, and stores an indication of the AN. During subsequent communications, the upstream switches include an indication of the AN corresponding to the key that was used to encrypt the data. Thus, the downstream switches can determine which key should be used to decrypt it (e.g., the old one or the new one). In this way, communication is not disrupted during the key process (because, for example, the downstream nodes are reconfigured prior to the upstream nodes).

For example, suppose the Current AN 255 for a Site 105B is zero. At the designated time, the Key Generator 235 generates a new key, determines that the AN "zero" is in use, and associates the new key with an AN of "one." The Deployment Component 240 then transmits the new key and AN to the downstream controller. During this process, the local switches of the upstream Site 105A continue to use the old key (and old AN) for data transmissions. Upon receiving confirmation that the new key was deployed on the downstream node(s), the Deployment Component 240 reconfigures the local switches to use the new key, and updates the Site Record 245. Thereafter, when local switches transmit data to the downstream site, they use the Current Key 250 and Current AN 255. In one embodiment, the downstream switches continue to use both the old key and the new key for decryption, depending on the AN associated with the packet. After predefined criteria are satisfied (e.g., a period of time), the old key can be phased out.

In an embodiment, when the next rekey begins, the Key Generator 235 will utilize an AN of "zero," because the AN of "one" is already in use. In some embodiments, the AN can have additional values. For example, in an embodiment, if the AN is two bits long, up to four prior encryption keys can be stored and used by the nodes. Similarly, if three bits are used, up to eight keys can be recognized by the upstream and downstream nodes. In this way, the system can ensure that packets are not dropped because they cannot be decrypted, even when rekeys occur frequently. Further, in an embodiment, if the rekey of the downstream Site 105 was not successful, the Site Record 245 is not updated, and the local switches continue to use the existing key and AN. In embodiments, the Controller 110 can then retry the rekey, or the process can be aborted until the next scheduled rekey. In this way, embodiments of the present disclosure enable individual rekeying of downstream sites, which improves data security and consistency.

Figure 3A:
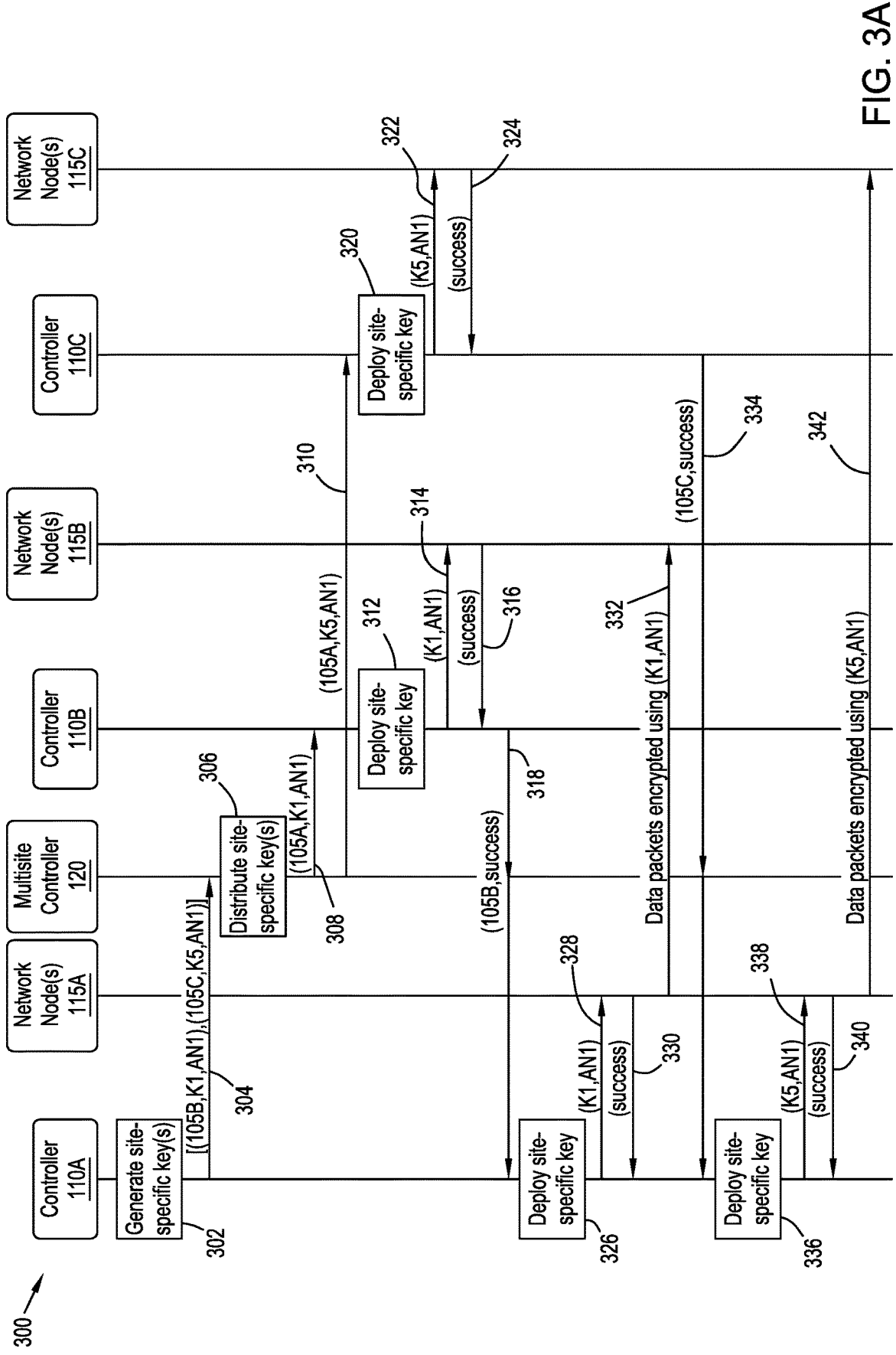
FIG. 3A is a flow diagram illustrating a workflow for successful key distribution, according to one embodiment disclosed herein.

FIG. 3A is a flow diagram illustrating a workflow 300 for successful key distribution, according to one embodiment disclosed herein. As illustrated, the workflow 300 begins at block 302, when the upstream Controller 110A generates site-specific keys for each downstream Site 105. As indicated by the arrow 304, these keys are then transmitted to the Multisite Controller 120 for distribution. As illustrated, a key "K1," associated with "AN1" has been created for Site 105B. Further, a key "K5," also associated with "AN1" has been created for Site 105C. Note that in embodiments, there is no requirement that the AN be unique across all sites. Additionally, as discussed above, in some embodiments, the information transmitted in arrow 304 is encrypted using a KEK that is specific to the upstream Site 105A. In one embodiment, the Controller 110A selects AN1 because it is marked or flagged as "available." In other embodiments, the Controller 110A selects AN1 because AN0 is already in use for the particular downstream site. In such an embodiment, if AN1 is in use for the current key (e.g., during the next rekey process), the Controller 110A selects AN0.

As illustrated, the Multisite Controller 120 receives these keys, and at block 306, distributes them to their respective sites. In some embodiments, this process comprises decrypting the data using the KEK associated with Site 105A, splitting it into separate data transmissions, and encrypting each with the corresponding KEK for the target downstream Site 105B-C. As illustrated by arrow 308, the Multisite Controller 120 transmits K1 and AN1 to the Controller 110B at Site 105B, along with an indication as to the upstream Site 105A. Further, as illustrated by arrow 310, the Multisite Controller 120 transmits K5 and AN1 to the Controller 110C at Site 105C, along with an indication as to the upstream Site 105A.

At block 312, the Controller 110B receives this data, decrypts with its KEK if necessary, and deploys the key K1 to its local nodes (e.g., switches). In one embodiment, based on the indication of the Site 105A included in the transmission, the Controller 110B determines which Network Nodes 115B and/or interfaces should be reconfigured. That is, in an embodiment, the Controller 110B determines which interfaces, ports, or Network Nodes 115B are coupled with a node in Site 105A. In the illustrated embodiment, the Controller 110B reprograms the interface(s) or node(s) used to receive data (e.g., Rx node(s)) from the Site 105A, but does not reprogram the nodes or interfaces that transmit data (Tx nodes) to the Site 105A. In such an embodiment, the Site 105B can use a first key to receive and decrypt data from the Site 105A, and a second key to encrypt and transmit data to the Site 105A.

In one embodiment, a similar process can be initiated by the Controller 105B to generate and distribute new keys to all of its downstream sites. For example, in an embodiment, the Controller 110B can also initiate the workflow 300, with Site 105B acting as the upstream site, and Site 105A acting as the downstream site. In this way, each Controller 110 generates its own transmit keys for each other site, and the remote sites reprogram themselves to receive messages encrypted with the new key(s).

In one embodiment, the Controller 1108 also programs the transmit interfaces, ports, or Network Nodes 115B using the new key (K1). In such an embodiment, each of the Sites 105A and 105B can both transmit and receive data using the same key. However, in some embodiments, the Controller 1108 programs only the transmit interfaces or ports of Network Nodes 115B using the new key, and the upstream Site 105A uses the new key for receiving data from the Site 105B, but not for encrypting and transmitting data to the Site 105B. Thus, in embodiments, the key used for encryption is not related to the key used for decryption. In some embodiments, the rekey process can be repeated in the opposite direction if the site wishes to use the same key for both transmitting and receiving data (e.g., the Controller 1106 can initiate a second rekey). However, as both sites operate independently, in an embodiment, network latency in each direction is likely to introduce at least an element of randomness or unpredictability, which may make it unlikely that both sites use the same key for encryption and decryption at the same time.

As illustrated by arrow 314, the Controller 115B pushes the new key K1 to the identified nodes, along with the new AN1. The Network Nodes 115B then implement the new key, and return an indication of success, as indicated by arrow 316. In an embodiment, the Network Nodes 115B and/or Controller 1106 also store an indication of the AN1 in association with the new key K1. In this way, when new packets are received, the Network Node 115B can determine the AN associated with the packet, retrieve the corresponding key, and decrypt the packet. In one embodiment, the Network Nodes 115B continue to utilize the old key as well, until predefined criteria (e.g., a predefined period of time) are satisfied. In this way, the Site 105B can continue to receive packets from the Site 105A encrypted using the old key, until the upstream Network Nodes 115A are reprogramed to use the new key K1.

Similarly, at block 320, the Controller 110C receives the new key data, decrypts with its KEK if necessary, and deploys the key K5 to its local nodes. In one embodiment, based on the indication of the Site 105A included in the transmission, the Controller 110C determines which Network Nodes 115C and/or interfaces should be reconfigured. That is, in an embodiment, the Controller 110C determines which interfaces, ports, or Network Nodes 115C are coupled with a node in Site 105A. As discussed above, in the illustrated embodiment, the Controller 110C reprograms the interface(s) or node(s) used to receive data (e.g., Rx node(s)) from the Site 105A, but does not reprogram the nodes or interfaces that transmit data (Tx nodes) to the Site 105A. In such an embodiment, the Site 105C can use a first key to receive and decrypt data from the Site 105A, and a second key to encrypt and transmit data to the Site 105A.

In one embodiment, a similar process can be initiated by the Controller 105C to generate and distribute new keys to all of its downstream sites. For example, in an embodiment, the Controller 110C can also initiate the workflow 300, with Site 105C acting as the upstream site, and Site 105A acting as the downstream site. In this way, each Controller 110 generates its own transmit keys for each other site, and the remote sites reprogram themselves to receive messages encrypted with the new key(s).

In some embodiments, the Controller 110C also programs the transmit interfaces, ports, or Network Nodes 115C using the new key (K5). In such an embodiment, each of the Sites 105A and 105C can both transmit and receive data using the same key. Further, in one embodiment, the Controller 110C programs only the transmit interfaces or ports of Network Nodes 115C using the new key, and the upstream Site 105A uses the new key for receiving data from the Site 105C, but not for encrypting and transmitting data to the Site 105C.

As illustrated by arrow 322, the Controller 115C pushes the new key K5 to the identified nodes, along with the new AN1. The Network Nodes 115C then implement the new key, and return an indication of success, as indicated by arrow 324. In an embodiment, the Network Nodes 115C and/or Controller 110C also store an indication of the AN1 in association with the new key K5. In this way, when new packets are received, the Network Node 115C can determine the AN associated with the packet, retrieve the corresponding key, and decrypt the packet.

As illustrated in arrow 318, the Controller 1106 transmits the indication of successful rekeying to the Multisite Controller 120, which forwards it to the upstream Controller 110A. In some embodiments, as discussed above, the Controller 1106 encrypts the indication using its site-specific KEK prior to transmission. The Multisite Controller 120 then decrypts it with the KEK associated with Site 105B, and re-encrypts it using the KEK corresponding to Site 105A. Upon receiving this confirmation, the Controller 110A deploys the site-specific key for the Site 1056 to its local Network Nodes 115A, as illustrated by block 326.

In one embodiment, the Controller 110A identifies the ports, interfaces, nodes, and/or Network Nodes 115A that are communicatively coupled with one or more nodes in Site 105B. Specifically, in the illustrated embodiment, the Controller 110A identifies Network Nodes 115A (e.g., interfaces or ports on the nodes) that are used to transmit data to the Site 105B. Of course, in some embodiments, as discussed above, the Controller 110A may alternatively identify ports or interfaces that are used to receive data from the Site 105B, or may reprogram the Network Nodes 115A to both receive and transmit data to the Site 1056 using the new key.

As illustrated by the arrow 328, the Controller 110A pushes K1 and AN1 to the identified Network Nodes 115A, which deploy them such that outgoing packets destined for Site 105B are encrypted using K1. In embodiments, the Network Nodes 115A and/or Controller 110A also store an indication of AN1, in association with K1 and/or with the Site 105B. In this way, the Network Nodes 115A can determine that when a packet is to be transmitted to a node at Site 105B, the corresponding AN is AN1, and the corresponding key to be used is K1. As illustrated by arrow 330, the Network Nodes 110A then return an indication that the key was successfully deployed. In one embodiment, the Controller 110A then marks or flags the AN1 as "in use." In some embodiments, the Controller 110A also marks the old AN as "available." In one embodiment, the Controller 110A marks the old AN as available only after predefined criteria are satisfied (e.g., a predefined period of time).

Further, as illustrated by arrow 334, the Controller 110C transmits the indication of successful rekeying to the Multisite Controller 120, which forwards it to the upstream Controller 110A. In some embodiments, as discussed above, the Controller 110C encrypts the indication using its site-specific KEK prior to transmission. The Multisite Controller 120 then decrypts it with the KEK associated with Site 105C, and re-encrypts it using the KEK corresponding to Site 105A. Upon receiving this confirmation, the Controller 110A deploys the site-specific key for the Site 105C to its local Network Nodes 115A, as illustrated by block 336 and discussed above with reference to arrows 328 and 330.

Finally, as indicated by arrows 332 and 342, the Network Nodes 115A transmit data to the Network Nodes 115B and 115C, respectively, using data packets encrypted using K1 and K5, respectively. As discussed above, in some embodiments, the Network Nodes 115A include an indication of the current AN (e.g., AN1) when transmitting packets encrypted using K1 and K5. In this way, the downstream nodes can determine which key to use to decrypt the packets. For example, upon receiving an encrypted packet, the Network Nodes 115B can identify the source Site 105A, identify the AN specified by the packet, and retrieve the key that corresponds to the Site 105A and AN. In other embodiments, the Network Nodes 115B determine which key to use based on the source of the packet. For example, in an embodiment, the Network Node 115B can determine that the packet was sent from a Network Node 115A, and therefore determine that the appropriate key for decrypting the packet is K1.

Figure 3B:
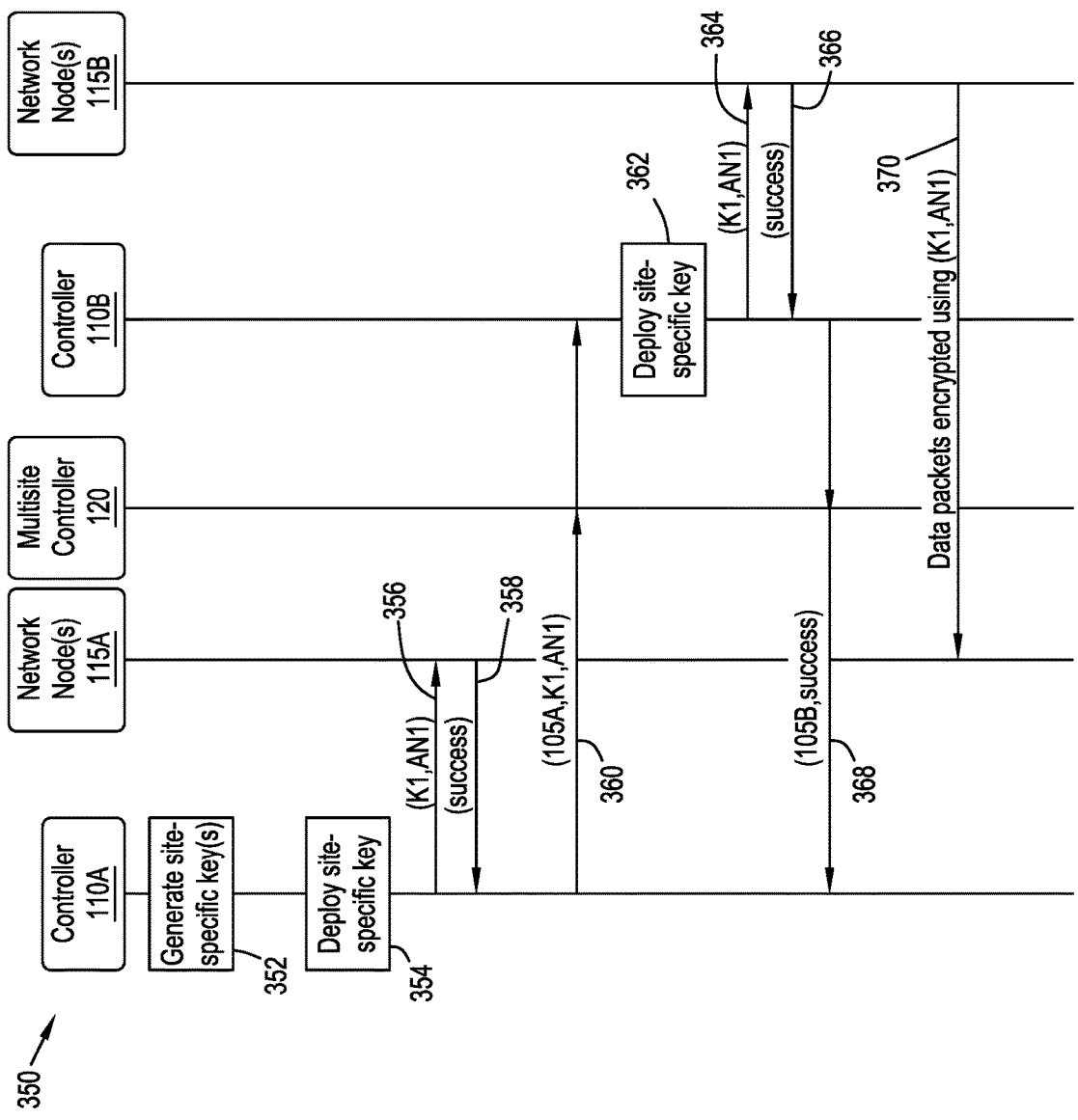
FIG. 3B is a flow diagram illustrating a workflow for successful key distribution, according to one embodiment disclosed herein.

FIG. 3B is a flow diagram illustrating a workflow 350 for successful key distribution, according to one embodiment disclosed herein. As illustrated, the workflow 350 begins at block 352, when the Controller 110A generates site-specific keys for each other Site 105. As illustrated by block 354, rather than immediately transmitting these new keys to the other sites, the Controller 110A then deploys the site-specific key(s) to the switch(es) responsible for receiving data from the Site 105B site. As illustrated by arrow 356, a key "K1," associated with "AN1" has been created for Site 105B.

In one embodiment, the Controller 110A identifies the ports, interfaces, nodes, and/or Network Nodes 115A that are communicatively coupled with one or more nodes in Site 105B. As illustrated by the arrow 356, the Controller 110A pushes K1 and AN1 to the identified Network Nodes 115A, which deploy them such that incoming packets received from Site 105B are decrypted using K1. In embodiments, the Network Nodes 115A and/or Controller 110A also store an indication of AN1, in association with K1 and/or with the Site 105B. In this way, the Network Nodes 115A can determine that when a packet is received from a node at Site 105B, the corresponding AN is AN1, and the corresponding key is K1. As illustrated by arrow 358, the Network Nodes 110A then return an indication that the key was successfully deployed. In one embodiment, the Controller 110A then marks or flags the AN1 as "in use."

In some embodiments, the Controller 110A also marks the old AN as "available." In one embodiment, the Controller 110A marks the old AN as available only after predefined criteria are satisfied (e.g., a predefined period of time). In one embodiment, the Site 105A continues to utilize the old key for decrypting packets from the Site 105B, for at least a period of time, to allow the Site 105B time to reconfigure its transmit nodes. In this way, no packets are lost as a result of the rekey process.

In the illustrated embodiment, the Controller 110A reprograms the Network Nodes 115A to receive data from the Site 105B using the new key K1. In some embodiments, the Controller 110A may alternatively identify ports or interfaces that are used to transmit data to the Site 105B, rather than ports or interfaces used to receive data. Further, in one embodiment, the Controller 110A reprograms the Network Nodes 115A to both receive and transmit data to the Site 105B using the new key K1.

In the illustrated embodiment, once the new key is successfully deployed to the receiving Network Nodes 115A, the new key is transmitted to the Controller 1106, as illustrated by arrow 360. In some embodiments, the new key may be transmitted via the Multisite Controller 120, or via a direct connection to the Controller 1106. Note that in embodiments, there is no requirement that the AN be unique across all sites. Additionally, as discussed above, in some embodiments, the information transmitted in arrow 360 is encrypted using a KEK that is specific to the Site 105A. In one embodiment, the Controller 110A selects AN1 because it is marked or flagged as "available." In other embodiments, the Controller 110A selects AN1 because AN0 is already in use for the particular remote site. In such an embodiment, if AN1 is in use for the current key (e.g., during the next rekey process), the Controller 110A selects AN0.

At block 362, the Controller 1106 receives this data, decrypts with its KEK if necessary, and deploys the key K1 to its local nodes (e.g., switches). In one embodiment, based on the indication of the Site 105A included in the transmission, the Controller 1106 determines which Network Nodes 115B and/or interfaces should be reconfigured. That is, in an embodiment, the Controller 1106 determines which interfaces, ports, or Network Nodes 115B are coupled with a node in Site 105A. In the illustrated embodiment, the Controller 1106 reprograms the Network Nodes 115B (e.g., the interfaces or ports that transmit data to the Site 105A) to encrypt data for the Site 105A using the new key K1. In some embodiments, the Controller 1106 may alternatively identify ports or interfaces that are used to receive data from the Site 105A, rather than ports or interfaces used to transmit data. Further, in one embodiment, the Controller 1106 reprograms the Network Nodes 115B to both receive and transmit data to and from the Site 105A using the new key K1, As illustrated by arrow 364, the Controller 115B then pushes the new key K1 to the identified nodes, along with the new AN1. The Network Nodes 115B then implement the new key, and return an indication of success, as indicated by arrow 366. In an embodiment, the Network Nodes 115B and/or Controller 1106 also store an indication of the AN1 in association with the new key K1. In this way, when received packet is to be transmitted to the Site 105A, the Network Node 115B can determine the AN associated with the Site 105A, retrieve the corresponding key, and encrypt the packet. In one embodiment, the Network Nodes 115A similarly determine to use the key K1 to decrypt packets, based on determining that the source of the packet is in Site 105B.

As illustrated in arrow 368, the Controller 1106 transmits the indication of successful rekeying to the Controller 110A. As discussed above, in some embodiments, this acknowledgement is transmitted via the Multisite Controller 120. Further, in some embodiments, as discussed above, the Controller 1106 encrypts the indication using its site-specific KEK prior to transmission. The Multisite Controller 120 then decrypts it with the KEK associated with Site 105B, and re-encrypts it using the KEK corresponding to Site 105A. Upon receiving this confirmation, as indicated by arrow 370, the Network Nodes 115A communicate with the Network Nodes 115B using data packets encrypted using K1. In an embodiment, the Network Nodes 1156 begin immediately using the new key K1, and do not wait for the indication of success to reach the Site 105A. In this way, the delay introduced by the rekey is reduced. Thus, in some embodiments, the Network nodes 115A may receive one or more packets encrypted with the new key K1, prior to the Controller 110A receiving any indication of successful rekey at the Site 105B. However, because the Controller 110A already reprogrammed the local nodes (at block 354), they can immediately decrypt the packets.

Figure 4A:
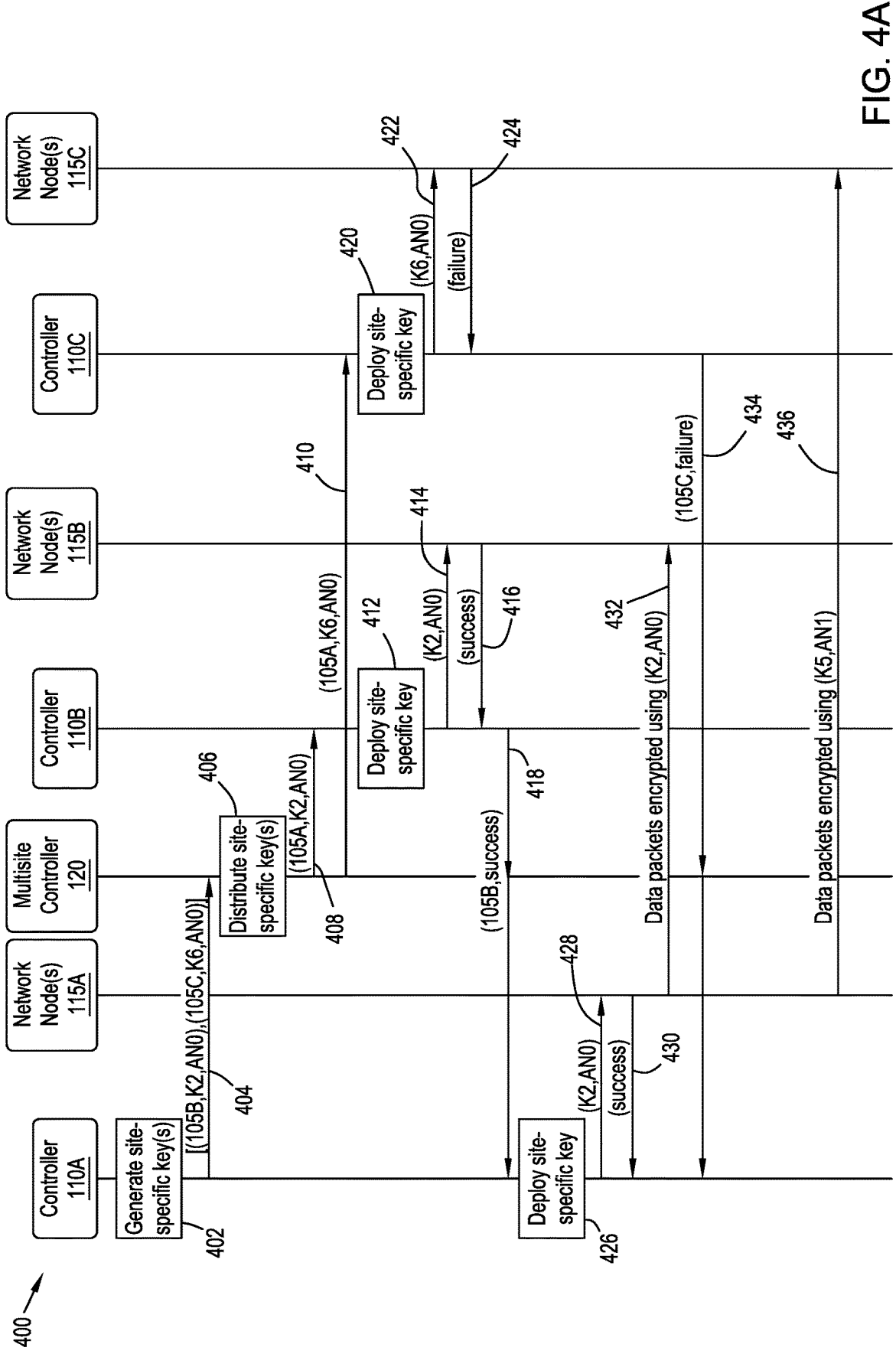
FIG. 4A is a flow diagram illustrating a workflow of failed key distribution, according to one embodiment disclosed herein.

FIG. 4A is a flow diagram illustrating a workflow 400 of failed key distribution, according to one embodiment disclosed herein. In the illustrated embodiment, the workflow 400 corresponds to the rekey process that follows the workflow 300. That is, in the illustrated embodiment, the workflow 400 illustrates the next rekey that occurs after the successful rekey discussed above in reference to the workflow 300. Thus, in the illustrated embodiment, at the beginning of the workflow 400, the Network Nodes 115A communicate with the Network Nodes 115B and 115C using K1 and K5, respectively. In the workflow 400, the failure occurs in Site 105C, as discussed below in more detail.

As illustrated, the workflow 400 begins at block 402, when the upstream Controller 110A generates new site-specific keys for each downstream Site 105. As indicated by the arrow 404, these keys are again transmitted to the Multisite Controller 120 for distribution. As illustrated, a new key "K2," associated with "AN0" has been created for Site 105B to replace K1. Further, a new key "K6," also associated with "AN0" has been created for Site 105C to replace K5. As discussed above, in one embodiment, the Controller 110A selects AN0 for K2 based on determining that it is not currently in use for communications between Site 105A and 105B. Further, in an embodiment, the Controller 110A selects AN0 for K6 based on determining that it is not currently in use for communications between Site 110A and 110C. Note that there is no requirement that the AN be the same value for each downstream site. In one embodiment, if AN0 and AN1 are both in use for a particular downstream site (e.g., because one or more nodes in one or more sites are still using the old key), the rekey process is aborted or delayed with respect to the particular downstream site. In some embodiments, rather than delay or abort the rekey, the Controller 110A selects a different value for the AN (e.g., AN2) and initiates the rekey.

As illustrated, the Multisite Controller 120 receives these keys, and at block 406, distributes them to their respective sites. As illustrated by arrow 408, the Multisite Controller 120 transmits K2 and AN0 to the Controller 110B at Site 105B, along with an indication as to the upstream Site 105A. Further, as illustrated by arrow 410, the Multisite Controller 120 transmits K6 and AN0 to the Controller 110C at Site 105C, along with an indication as to the upstream Site 105A. At block 412, the Controller 110B receives this data, decrypts with its KEK if necessary, and deploys the key K2 to its local switches.

In one embodiment, based on the indication of the Site 105A included in the transmission, the Controller 110B determines which Network Nodes 115B and/or interfaces should be reconfigured. That is, in an embodiment, the Controller 110B determines which interfaces, ports, or Network Nodes 115B are coupled with a node in Site 105A. In the illustrated embodiment, the Controller 110B reprograms the interface(s) or node(s) used to receive data (e.g., Rx node(s)) from the Site 105A, but does not reprogram the nodes or interfaces that transmit data (Tx nodes) to the Site 105A. In such an embodiment, the Site 105B can use a first key to receive and decrypt data from the Site 105A, and a second key to encrypt and transmit data to the Site 105A.

As illustrated by arrow 414, the Controller 115B then pushes the new key K1 to the identified nodes, along with the new AN1. The Network Nodes 115B then implement the new key, and return an indication of success, as indicated by arrow 416. In an embodiment, the Network Nodes 115B also store an indication of the AN0 in association with the new key K2.

Note that in some embodiments, in addition to storing the new K2 and AN0, the Network Nodes 115B continue to store an indication of AN1, in association with the old key K1. In this way, when a new packet is received, the Network Node 115B can select either K1 or K2, based on whether the packet is associated with AN1 or AN0. In some embodiments, K1 and/or AN1 are subsequently removed or marked as unused after predefined criteria are satisfied. For example, in one embodiment, after a predefined period of time from when the new key K2 and AN0 was received (e.g., sufficient time to ensure that no additional packets encrypted using K1 are forthcoming), AN1 is marked as unused. In one embodiment, AN1 is marked unused after a predefined period of time has passed from when the last packet that indicated AN1 is received. In this way, the Network Nodes 115B continue to store K1 for decrypting packets until the Site 105A stops sending such packets.

Further, at block 420, the Controller 110C receives the new key data, decrypts with its KEK if necessary, and deploys the new key K6 to its local switches. In the illustrated embodiment, the Controller 110C reprograms the interface(s) or node(s) used to receive data (e.g., Rx node(s)) from the Site 105A, but does not reprogram the nodes or interfaces that transmit data (Tx nodes) to the Site 105A. As illustrated by arrow 422, the Controller 115C pushes the new key K6 to the identified nodes, along with the new AN0. The Network Nodes 115C then attempt to implement the new key, but in the illustrated embodiment, the rekey fails with respect to at least one of the interfaces, ports, or Network Nodes 115C. Thus, as illustrated by arrow 424, the Network Nodes 115C return an indication of failure. In one embodiment, if a single interface, node, or Network Node 115C fails to implement the new key K6, the Controller 110C reports that deployment has failed, and all of the Network Nodes 110C operate using the old key K5. Advantageously, however, the other sites (e.g., Site 105B) can operate using their respective new keys (e.g., K2), without interruption.

As illustrated in arrow 418, the Controller 110B transmits the indication of successful rekeying to the Multisite Controller 120, which forwards it to the upstream Controller 110A. Upon receiving this confirmation, the Controller 110A deploys the site-specific key for the Site 105B to its local Network Nodes 115A, as illustrated by block 426. In the illustrated embodiment, the Controller 110A reprograms the interface(s) or node(s) used to transmit data to the Site 105B. As illustrated by the arrow 428, the Controller 110A pushes K2 and AN0 to the relevant Network Nodes 115A, which deploy them such that outgoing packets destined for Site 105B are encrypted using K2. In embodiments, the Network Nodes 115A also store an indication of AN0, in association with K2 and/or with the Site 105B. In this way, the Network Nodes 115A can determine that when a packet is to be transmitted to a node at Site 105B, the corresponding AN is AN0, and the corresponding key is K2.

As illustrated by the arrow 432, the Network Nodes 115A thus begin utilizing the new key K2 for outgoing packets bound for a node in Site 105B. In one embodiment, the Network Nodes 115A begin encrypting outgoing data packets using the new key K2, and abandon use of the old key K1 entirely. Thus, in some embodiments, either immediately or after a period of time, the old key K1 is no longer in use, and the Controller 110A marks the old AN1 as available or not in use.

Further, as illustrated by arrow 434, the Controller 110C transmits the indication of unsuccessful rekeying to the Multisite Controller 120, which forwards it to the upstream Controller 110A. As discussed above, in some embodiments, if a single node or interface in the Site 105C fails the rekey process, the process is aborted for the entire site and the Site 105C continues to use the old key K5. This embodiment is indicated in the illustrated embodiment by arrow 436, where the Network Nodes 115A continue to communicate with the Switches 115C using data packets encrypted using the old key K5. Notably, in such an embodiment, the Controller 110A refrains from flagging the new AN0 as in use, and similarly refrains from marking the old AN1 as available.

In some embodiments, the Network Nodes 115C that successfully deployed the new key K6 utilize it for decrypting incoming packets, while the failed nodes remain using the old key K5. In such an embodiment, the communication from the Controller 110C to the Controller 110A, represented by arrow 434, can include an indication as to which ports, interfaces, nodes, and/or Network Nodes 115C were successful in the rekey. In an embodiment, the Controller 110A then identifies which ports, interfaces, nodes, and/or Network Nodes 115A are coupled with these successful switches, and reconfigures only these identified interfaces to use the new key K6 to encrypt data for the Site 105C. In one embodiment, the remaining Network Nodes 115A continue to use the old key K5, until the next successful rekey. In such an embodiment, both AN0 and AN1 will be considered "in use" with respect to the Site 105C, until one or both are replaced with a new key and AN, or until one or both of the keys and ANs time out or are abandoned by the nodes.

Figure 4B:
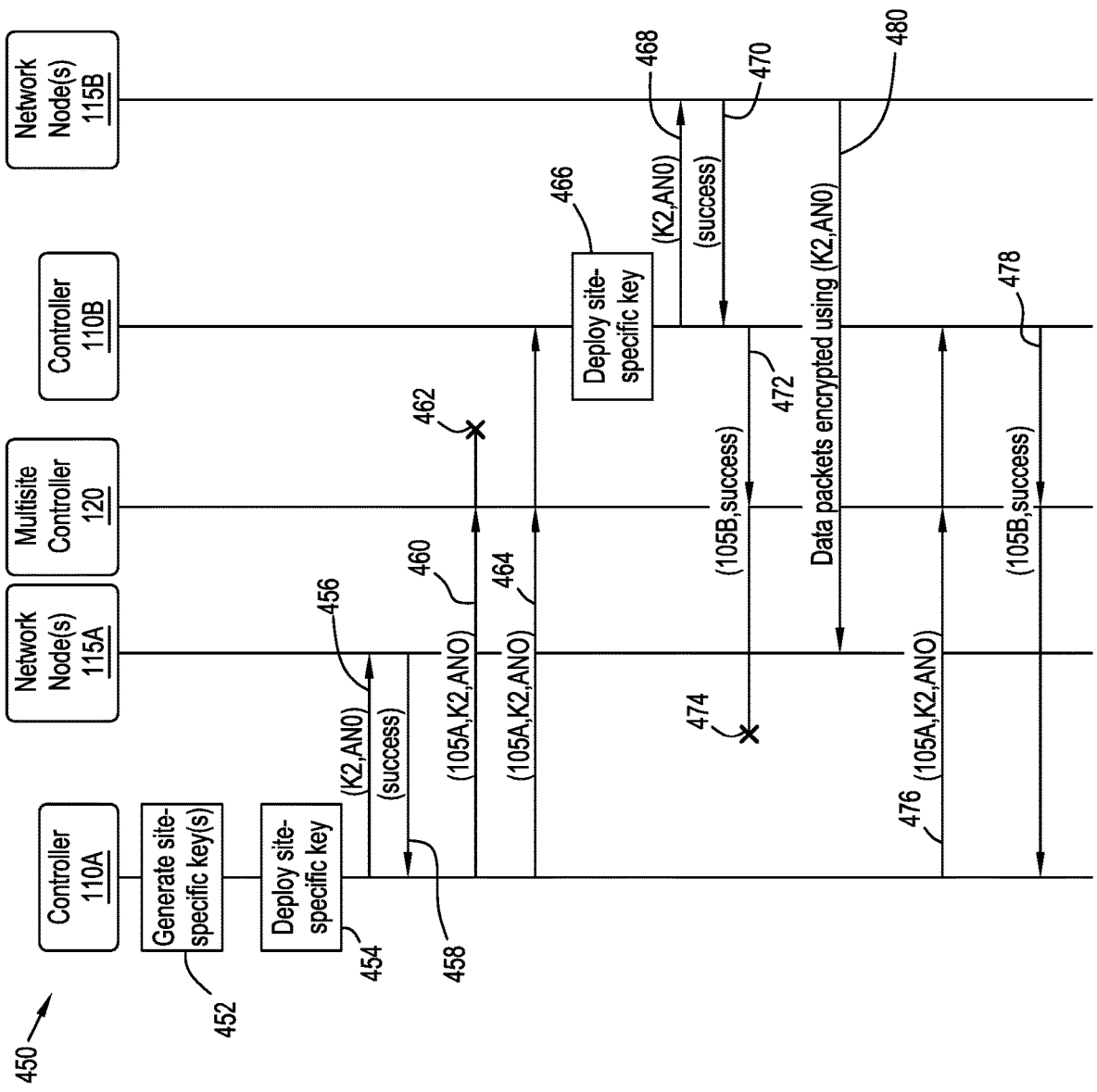
FIG. 4B is a flow diagram illustrating a workflow of failed key distribution, according to one embodiment disclosed herein.

FIG. 4B is a flow diagram illustrating a workflow 450 for of failed key distribution, according to one embodiment disclosed herein. In the illustrated embodiment, the workflow 450 corresponds to the rekey process that follows the workflow 350. That is, in the illustrated embodiment, the workflow 450 illustrates the next rekey that occurs after the successful rekey discussed above in reference to the workflow 350. Thus, in the illustrated embodiment, at the beginning of the workflow 450, the Network Nodes 115A communicate with the Network Nodes 115B using K1. In the workflow 450, a first failure occurs in transmitting the new key to the remote site, and a second failure occurs in returning an acknowledgement or indication of success, as discussed below in more detail.

As illustrated, the workflow 450 begins at block 452, when the Controller 110A generates new site-specific keys for each other Site 105. As illustrated by block 454, rather than immediately transmitting these new keys to the other remote sites, the Controller 110A then deploys the new site-specific key(s) to the switch(es) responsible for receiving data from the respective sites. As illustrated by arrow 456, a key "K2," associated with "AN0" has been created for Site 105B. As discussed above, in one embodiment, the Controller 110A selects AN0 for K2 based on determining that it is not currently in use for communications between Site 105A and 105B. Note that there is no requirement that the AN be the same value for each other site. In one embodiment, if AN0 and AN1 are both in use for a particular site (e.g., because one or more nodes in the site are still using the older key, while one or more other nodes are using the newer key), the rekey process is aborted or delayed with respect to the particular site. In some embodiments, rather than delay or abort the rekey, the Controller 110A selects a different value for the AN (e.g., AN2) and initiates the rekey.

In one embodiment, the Controller 110A identifies the ports, interfaces, nodes, and/or Network Nodes 115A that are that are used to transmit data to one or more nodes in Site 1056. As illustrated by the arrow 456, the Controller 110A pushes K1 and AN1 to the identified Network Nodes 115A, which deploy them such that incoming packets received from Site 105B are decrypted using K1. In embodiments, the Network Nodes 115A and/or Controller 110A also store an indication of AN1, in association with K1 and/or with the Site 105B. In this way, the Network Nodes 115A can determine that when a packet is received from a node at Site 105B, the corresponding AN is AN1, and the corresponding key is K1. As illustrated by arrow 458, the Network Nodes 110A then return an indication that the key was successfully deployed. In one embodiment, the Controller 110A then marks or flags the AN1 as "in use." In some embodiments, the Controller 110A also marks the old AN as "available." In one embodiment, the Controller 110A marks the old AN as available only after predefined criteria are satisfied (e.g., a predefined period of time).

In the illustrated embodiment, once the new key is successfully deployed to the receiving Network Nodes 115A, the new key is transmitted to the Controller 1106, as illustrated by arrow 460. In some embodiments, the new key may be transmitted via the Multisite Controller 120, or via a direct connection to the Controller 1106. Note that in embodiments, there is no requirement that the AN be unique across all sites. Additionally, as discussed above, in some embodiments, the information transmitted in arrow 460 is encrypted using a KEK that is specific to the Site 105A. In one embodiment, the Controller 110A selects AN1 because it is marked or flagged as "available." In other embodiments, the Controller 110A selects AN1 because AN0 is already in use for the particular other site. In such an embodiment, if AN1 is in use for the current key (e.g., during the next rekey process), the Controller 110A selects AN0.

In one embodiment, the Network Nodes 115A can continue to decrypt new packets from Site 105B using the old key K1, until some predefined criteria are satisfied. For example, in one embodiment, the Network Nodes 115A can utilize K1 for a predefined period of time has elapsed (or a period of time has elapsed since the node received a packet encrypted using the old key), or until the indication of success is received. In one embodiment, the Network Nodes 115A determine which key to use to decrypt the packet based on, for example, an AN specified by the packet.

In some embodiments, the new keys and acknowledgment messages are transmitted between the Sites 105 via a first set of channels or communication links, while ordinary communications (e.g., data packets) are exchanged using a second set of channels or links. As indicated by the "X" 462, in the illustrated embodiment, the new key information fails to arrive at the Controller 1106. In embodiments, this failure can occur at any point in the communications path (e.g., before or after the Multisite Controller 120), including in the Controller 110A or 1106. As illustrated by arrow 464, the Controller 110A periodically retransmits the new key information to the Site 1106, until receiving an acknowledgment of successful deployment.

In the illustrated embodiment, as indicated by arrow 464, the new key is then successfully transmitted and received by the Controller 1106. At block 466, the Controller 1106 receives this data, decrypts with its KEK if necessary, and deploys the new key K2 to its local nodes (e.g., switches). In one embodiment, based on the indication of the Site 105A included in the transmission, the Controller 1106 determines which Network Nodes 115B and/or interfaces should be reconfigured. That is, in an embodiment, the Controller 1106 determines which interfaces, ports, or Network Nodes 115B are coupled with a node in Site 105A. In the illustrated embodiment, the Controller 1106 deploys the new key K2 on the nodes responsible for encrypting and transmitting data to the Site 105A.

As illustrated by arrow 468, the Controller 115B then pushes the new key K2 to the identified nodes, along with the new AN0. The Network Nodes 115B then implement the new key, and return an indication of success, as indicated by arrow 470. In an embodiment, the Network Nodes 115B and/or Controller 110B also store an indication of the AN0 in association with the new key K2. In this way, when transmitting packets to the Site 105A, the Network Nodes 115B can use the new key K2 to encrypt the packets.

As illustrated in arrow 472, the Controller 110B transmits the indication of successful rekeying to the Controller 110A. As discussed above, in some embodiments, this acknowledgement is transmitted via the Multisite Controller 120. Further, in some embodiments, as discussed above, the Controller 110B encrypts the indication using its site-specific KEK prior to transmission. The Multisite Controller 120 then decrypts it with the KEK associated with Site 105B, and re-encrypts it using the KEK corresponding to Site 105A. In the illustrated embodiment, as indicated by the "X" 474, this acknowledgement was dropped along the communications path and does not reach the Controller 110A. As discussed above, this failure may occur due to any number of causes, at any point in the communication path.

As illustrated by arrow 480, in an embodiment, the Network Nodes 115B begin immediately using the new key K2 for transmitting data to the Site 105A. That is, although the indication of success failed to reach the Site 105A, the new key is already deployed and in use by the Site 105B. Because the Network Nodes 115A have already been reconfigured using the new key K2, they can successfully decrypt these packets regardless of the indication of success, In the illustrated embodiment, because the Controller 110A has not received an indication of success or acknowledgment from the Controller 110B, at arrow 476, the Controller 110A again retransmits this rekey information. Upon receipt of this communication, the Controller 110B determines that it has already deployed the indicated key, and returns another indication of success or acknowledgment. In some embodiments, the Controller 110A then flags AN1 as "available," because the Site 105B has successfully reconfigured its transmit nodes, and the old key K1 will no longer be used.

Figure 5:
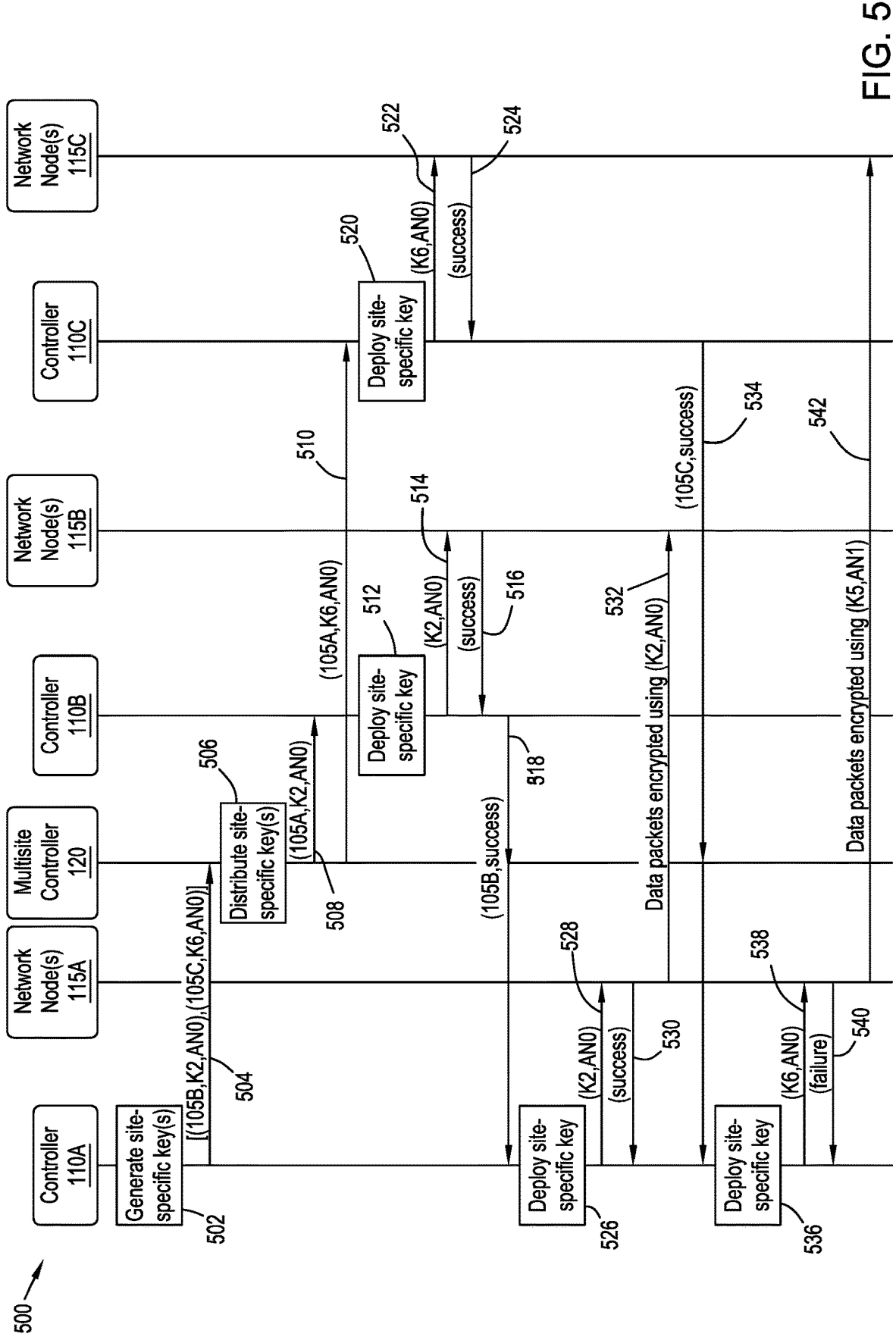
FIG. 5 is a flow diagram illustrating a workflow of failed key distribution, according to one embodiment disclosed herein.

FIG. 5 is a flow diagram illustrating a workflow 500 of failed key distribution, according to one embodiment disclosed herein. In the illustrated embodiment, the workflow 500 corresponds to the rekey process that follows the workflow 300. That is, in the illustrated embodiment, the workflow 500 illustrates the next rekey that occurs after the successful rekey discussed above in reference to the workflow 300. Thus, in the illustrated embodiment, at the beginning of the workflow 500, the Network Nodes 115A communicate with the Network Nodes 1156 and 115C using K1 and K5, respectively. In the workflow 500, the failure occurs in Site 105A, as discussed below in more detail.

As illustrated, the workflow 500 begins at block 502, when the upstream Controller 110A generates new site-specific keys for each downstream Site 105. As indicated by the arrow 504, these keys are again transmitted to the Multisite Controller 120 for distribution. As illustrated, a new key "K2," associated with "AN0" has been created for Site 1056 to replace K1. Further, a new key "K6," also associated with "AN0" has been created for Site 105C to replace K5. The Multisite Controller 120 then receives these keys, and at block 506, distributes them to their respective sites. At blocks 512 and 520, the Controllers 1106 and 110C receive this data, decrypt it with their respective KEKs if necessary, and deploy the new keys K2 and K6 to their respective local switches used for receiving data from the Site 105A, as discussed above.

As illustrated in arrows 518 and 534, the Controllers 1106 and 110C then transmit the indications of successful rekeying to the Multisite Controller 120, which forwards the indications to the upstream Controller 110A. Upon receiving this confirmation, the Controller 110A deploys the site-specific key for the Site 1056 to its local Network Nodes 115A used to transmit data to the Site 1056, as illustrated by block 526. As illustrated by the arrow 532, the Network Nodes 115A thus begin utilizing the new key K2 (and AN0) for outgoing packets bound for a node in Site 105B.

Further, at block 536, the Controller 110C attempts to deploy the site-specific key for the Site 105C (e.g., new key K6) to its local Network Nodes 115A used to transmit data to the Site 105B. However, as illustrated by arrow 540, in the illustrated embodiment, this rekey process fails for at least one port, interface, node, or Network Node 115A. In some embodiments, if a single node or interface in the Site 105A fails the rekey process, the process is aborted for the entire site, and the Site 105A continues to use the old key K5. In such an embodiment, the Controller 110A initiates a rekey process to revert the Site 105C back to the old key K5. In other embodiments, the Controller 110A can immediately retry to deploy the new key K6 at the failed nodes.

In some embodiments, if some of the Network Nodes 115A successfully deployed the new key K6, these successful switches utilize the new key for transmissions, while the failed nodes remain using the old key K5. In the illustrated embodiment, however, as depicted by the arrow 542, the Network Nodes 115A transmit data to the Network Nodes 115C using data packets encrypted with K5, as at least one node failed to successfully implement K6. As discussed above, in an embodiment, the downstream nodes maintain the old key and AN, such that when packets encrypted using the old key K5 (and associated with AN1) are received, they can still be decrypted.

Figure 6:
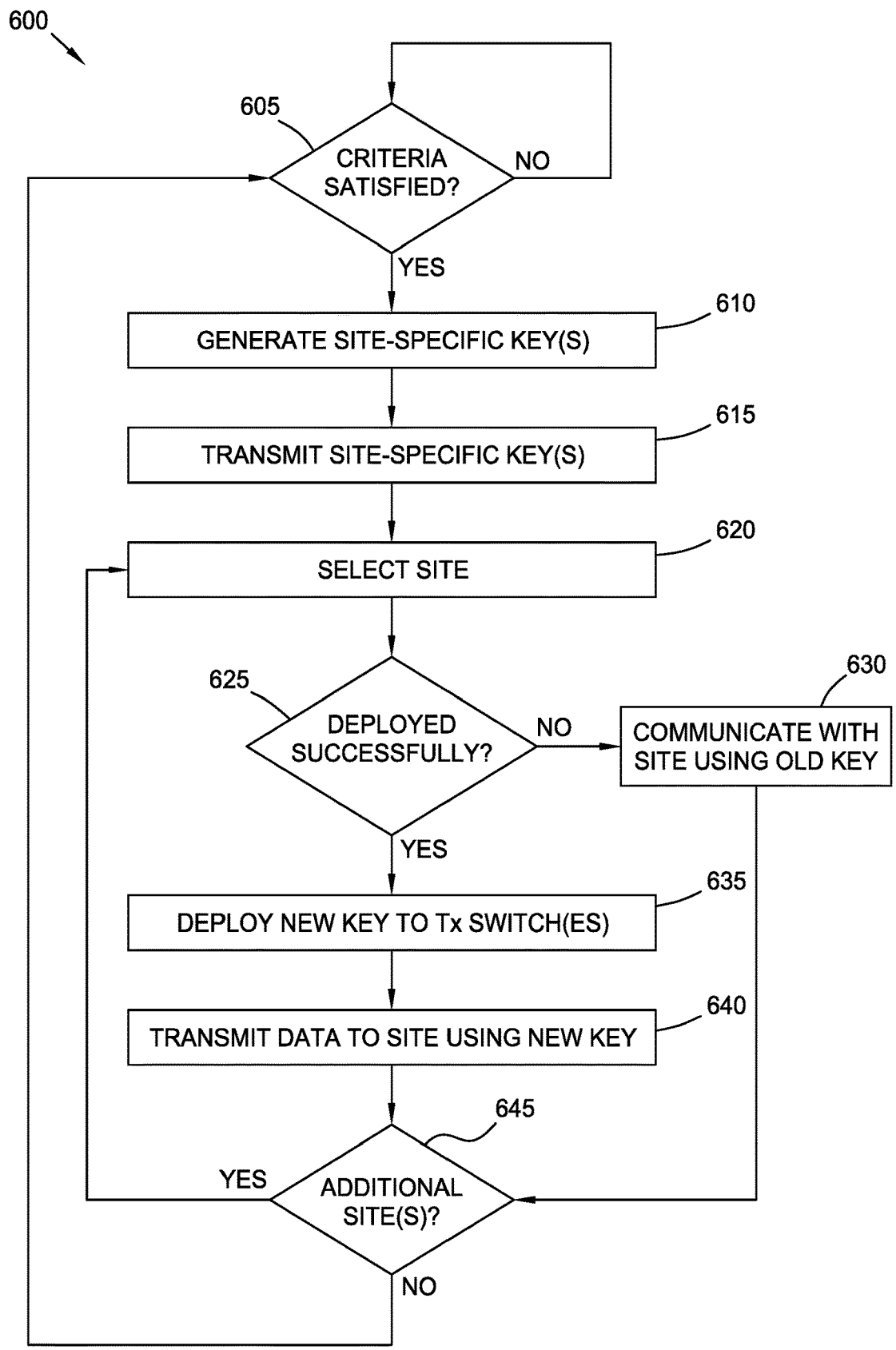
FIG. 6 is a flow diagram illustrating a method of key distribution, according to one embodiment disclosed herein.

FIG. 6 is a flow diagram illustrating a method 600 of key distribution, according to one embodiment disclosed herein. In the illustrated embodiment, the method 600 is performed at an upstream site. The method 600 begins at block 605, where the upstream Controller 110 (e.g., the Key Generator 235 of Controller 110A) determines whether predefined criteria are satisfied. In one embodiment, a predefined criterion is time-based. For example, in one embodiment, the criteria specify that the rekey process should be initiated for all downstream sites every minute, every hour, and the like. In some embodiments, the criteria relate to how much time has elapsed since the last successful rekey at each site. For example, in one embodiment, the criteria specify that a rekey should be attempted once a predefined period of time has elapsed since the last successful rekey. In some embodiments, the rekey process for one or more sites can also be triggered manually (e.g., by an administrator). For example, if the administrator suspects the encryption has become compromised (e.g., a malicious entity has obtained the key), the rekey process for the compromised site can be immediately initiated, without affecting other sites.

If the criteria are not satisfied, the method 600 loops at block 605. If the criteria are satisfied, however, the method 600 proceeds to block 610, where the upstream Controller 110 generates a site-specific key for each downstream site for which the criteria are satisfied. That is, the Controller 110 identifies the site(s) that are downstream from the Controller 110, and generates a unique key for each site. In some embodiments, one or more of the downstream sites can share a single key. For example, in one embodiment, an administrator can define two or more sites as a group or unit that should share a key, such that a rekey failure in one site triggers a rekey abort in the related sites.

The method 600 then proceeds to block 615, where the Controller 110 transmits the site-specific keys to the respective downstream controllers. In some embodiments, this comprises transmitting the keys to a centralized Multisite Controller 120 for distribution. At block 620, the Controller 110 selects a site from the list of downstream sites, and the method 600 proceeds to block 625. At block 625, the Controller 110 determines whether the respective new key was successfully deployed at the selected downstream site. In one embodiment, this comprises determining whether an indication of success has been received from the site. If so, the method 600 proceeds to block 635, where the Controller 110 deploys the corresponding key to its own local nodes. That is, the Controller 110 deploys the corresponding new key to the ports or interfaces used to transmit data to the selected downstream site. In some embodiments, the Controller 110 also marks the AN associated with the new key as "in use." Further, in one embodiment, the Controller 110 similarly marks the AN associated with the old key as "available." The method 600 then continues to block 640, where the upstream Site 105 (e.g., the local Network Nodes 115) encrypt and transmit data to the selected downstream site using the new key. The method then proceeds to block 645.

Additionally, if, at block 625, the Controller 110 determines that the key was not successfully deployed by the selected site, the method 600 continues to block 630. In one embodiment, the Controller 110 can determine the rekey failed based on receiving an indication of failure from the downstream site. In some embodiments, the Controller 110 also determines that the rekey failed if a predefined period of time has passed without receiving an indication or confirmation from the downstream controller. At block 630, the upstream site continues to encrypt and transmit data to the selected downstream site using the old key, rather than the new key. In such an embodiment, the Controller 110 refrains from marking the new AN as "in use." In some embodiments, the Controller 110 immediately triggers another attempt to rekey the selected site. In other embodiments, the downstream site is not rekeyed until the predefined criteria are satisfied again (e.g., a predefined period of time passes). The method 600 then continues to block 645.

At block 645, the Controller 110 determines whether there is at least one additional downstream site to be processed. If so, the method 600 returns to block 620 to select the next site. Otherwise, the method 600 returns to block 605, to determine whether the predefined criteria are satisfied. In this way, the Controller 110 rekeys downstream sites based on defined criteria, such that each downstream site utilizes its own site-specific key, distinct from keys used by other sites. As discussed above, the method 600 improves the functioning of the network, as a failure in a single site does not impact the security of other sites.

Figure 7:
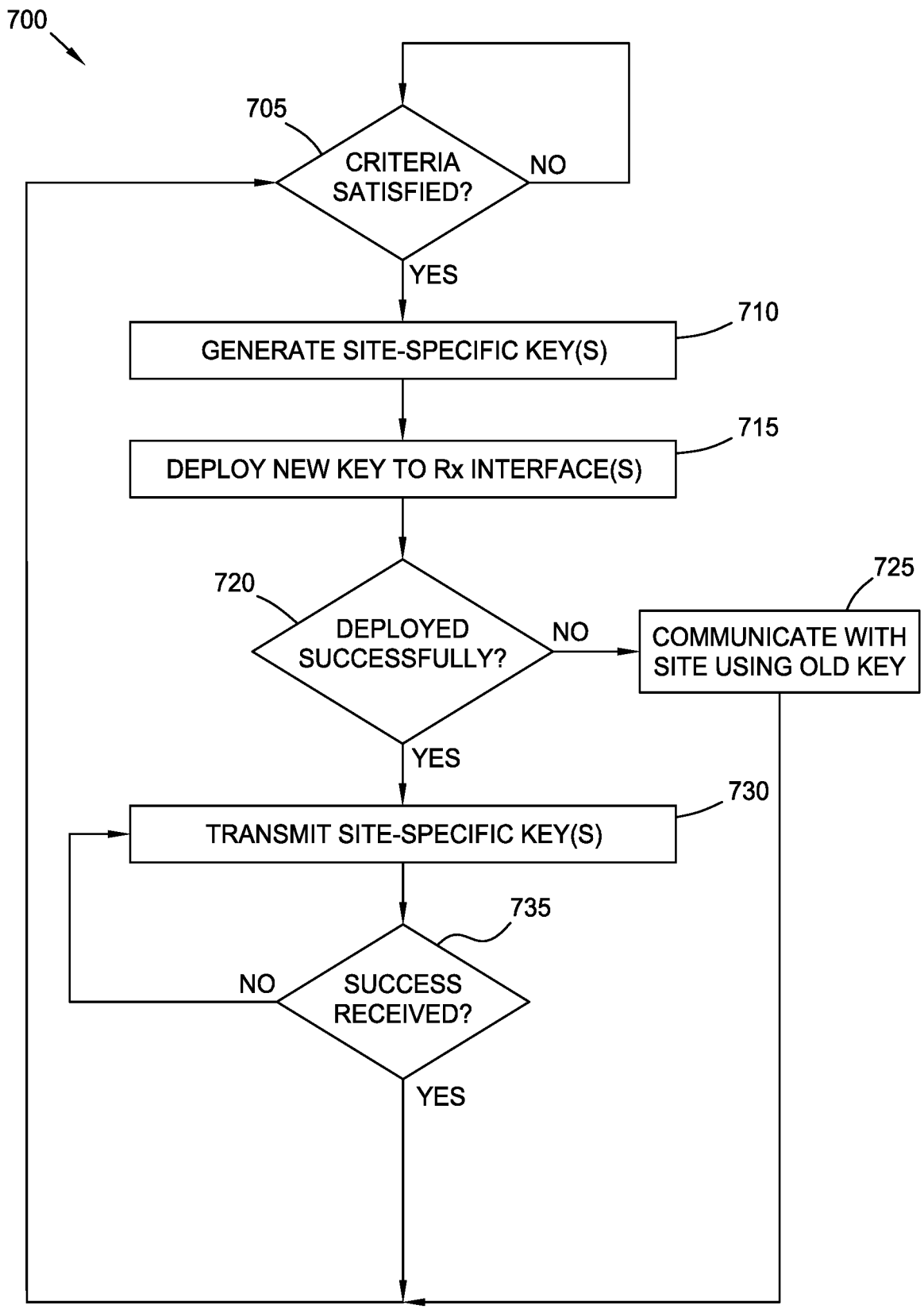
FIG. 7 is a flow diagram illustrating a method of key distribution, according to one embodiment disclosed herein.

FIG. 7 is a flow diagram illustrating a method 700 of key distribution, according to one embodiment disclosed herein. The method 700 begins at block 705, where the Controller 110 (e.g., the Key Generator 235 of Controller 110A) determines whether predefined criteria are satisfied. In one embodiment, a predefined criterion is time-based. For example, in one embodiment, the criteria specify that the rekey process should be initiated for all remote sites with which the site corresponds every minute, every hour, and the like. In some embodiments, the criteria relate to how much time has elapsed since the last successful rekey at each site. For example, in one embodiment, the criteria specify that a rekey should be attempted once a predefined period of time has elapsed since the last successful rekey. In some embodiments, the rekey process for one or more sites can also be triggered manually (e.g., by an administrator). For example, if the administrator suspects the encryption has become compromised (e.g., a malicious entity has obtained the key), the rekey process for the compromised site can be immediately initiated, without affecting other sites.

If the criteria are not satisfied, the method 700 loops at block 705. If the criteria are satisfied, however, the method 700 proceeds to block 710, where the Controller 110 generates a site-specific key for each other site for which the criteria are satisfied. That is, the Controller 110 identifies the site(s) that are communicatively couple with the Controller 110, and generates a unique key for each site. In some embodiments, one or more of the other sites can share a single key. For example, in one embodiment, an administrator can define two or more sites as a group or unit that should share a key, such that a rekey failure in one site triggers a rekey abort in the related sites.

The method 700 then proceeds to block 715, where the Controller 110 deploys the corresponding key to its own local nodes that receive data from the particular site for which the new key was generated. In some embodiments, the Controller 110 also marks the AN associated with the new key as "in use." Further, in one embodiment, the Controller 110 similarly marks the AN associated with the old key as "available," either immediately or after a predefined period of time (or after other criteria are satisfied, such as receiving the indication of success). The method 700 then continues to block 720, where the Controller 110 (e.g., the local Network Nodes 115) determines whether this deployment was successful. If not (e.g., if the local nodes failed to deploy the new key), the method 700 proceeds to block 725, where the site continues to receive and decrypt packets from the selected other site using the old key, rather than the new key. Further, because of the failure, the Controller 110 refrains from transmitting the new key information to the other site. In such an embodiment, the Controller 110 also refrains from marking the new AN as "in use." In some embodiments, the Controller 110 immediately triggers another attempt to rekey the selected site. In other embodiments, the other site is not rekeyed until the predefined criteria are satisfied again (e.g., a predefined period of time passes). The method 600 then returns to block 705.

In contrast, if the rekeying of the local nodes was successful, the method 700 proceeds to block 730, where the Controller 110 transmits the new key to the other controller (s). After predefined criteria are met (e.g., after a predefined period of time), the method 700 proceeds to block 735, where the Controller 110 determines whether an acknowledgment or indication of success has been received from the other site, indicating that the new key was successfully deployed. If not, the method 700 returns to block 730, where the Controller 110 transmits a new indication as to the rekey. In an embodiment, this process is repeated until the indication of success is received. Note that, as discussed above, the local site can immediately begin receiving packets encrypted using the new key, even if the indication of success is not received. Once this indication is received, the Controller 110 stops transmitting the key, and the method 700 returns to block 705.

Figure 8:
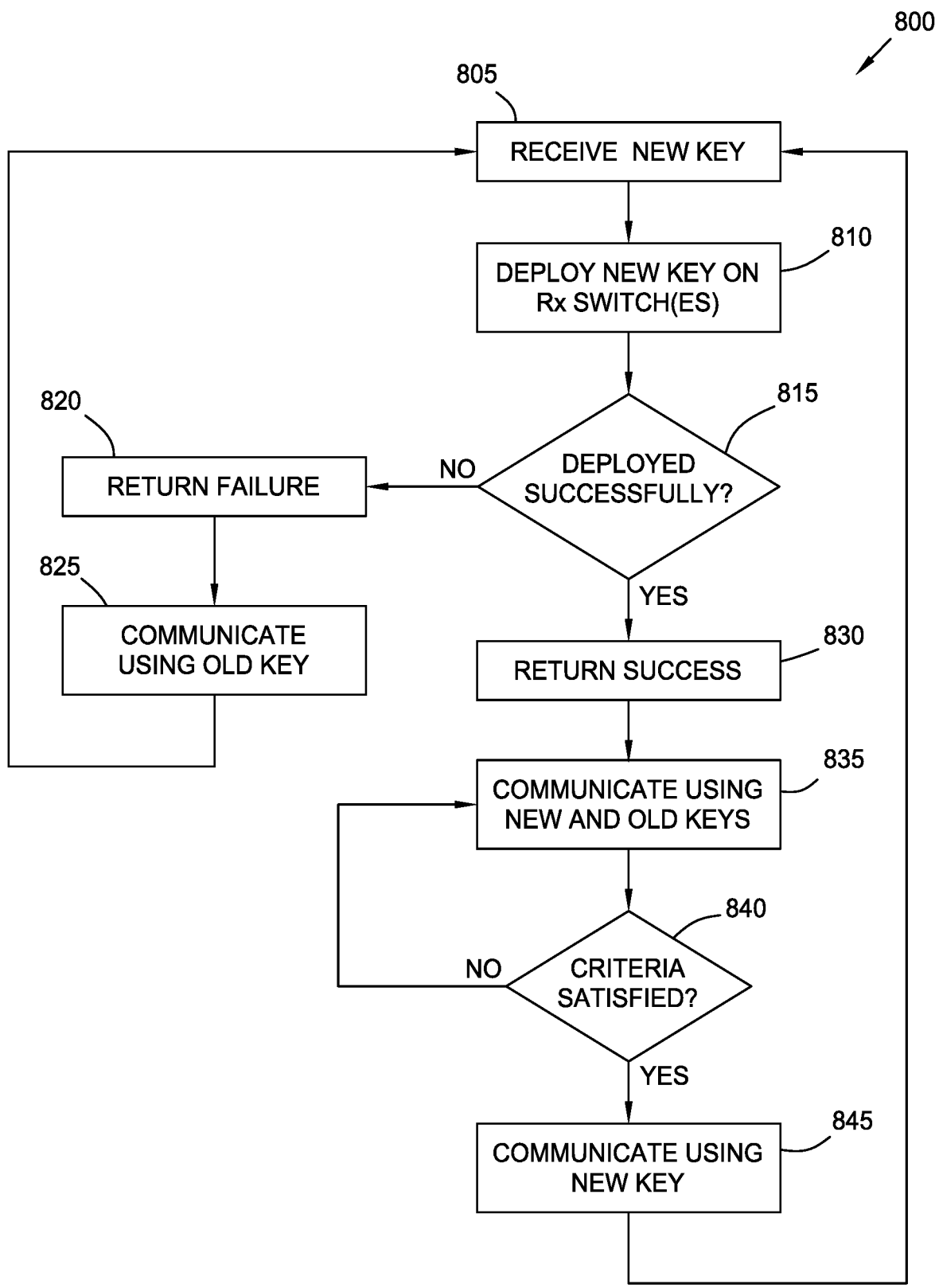
FIG. 8 is a flow diagram illustrating a method of key deployment, according to one embodiment disclosed herein.

FIG. 8 is a flow diagram illustrating a method 800 of key deployment, according to one embodiment disclosed herein. In the illustrated embodiment, the method 800 is performed at a downstream site. The method 800 begins at block 805, where the downstream Controller 110 receives a new key from an upstream controller. The method 800 then continues to block 810, where the Controller 110 deploys this new key to its local switches or interfaces that are used to receive data from the particular site. At block 815, the Controller 110 determines whether the new key was successfully implemented. If not (e.g., if the rekey failed for at least one switch or interface), the method 800 proceeds to block 820, there the Controller 110 returns an indication of failure to the upstream controller. The method 800 then continues to block 825, where the downstream site continues to decrypt data from the upstream site using the old key. This continues until the method 800 returns to block 805, when the Controller 110 receives another new key from the upstream controller.

If, however, the Controller 110 determines, at block 815, that the rekey was successful, the method 800 proceeds to block 830, where the Controller 110 returns an indication of successful rekey to the upstream controller. The method 800 then continues to block 835, where the downstream site communicates using both the new key and the old key. As discussed above, in one embodiment, the downstream switches use either the new key or the old key to decrypt received packets, depending on the AN associated with the packet. The method 800 then continues to block 840.

At block 840, the Controller 110 or downstream nodes determine whether predefined criteria are satisfied. For example, in one embodiment, the predefined criteria specify that the old key should remain in use until a predefined period of time has passed, to ensure that the upstream site has time to switch to the new key. In another embodiment, the criteria specify that the old key should remain until the downstream site receives an indication or confirmation from the upstream site that the rekey of the upstream nodes was successful. In one embodiment, the criteria specify that the old key should remain in use for decrypting data until a predefined period of time has passed since the last packet encrypted with the old key (e.g., indicating the old AN) was received. If the criteria are not satisfied, the method 800 returns to block 835, where the nodes continue to use both the old key and the new key to decrypt incoming packets. If, however, the criteria are satisfied, the method 800 proceeds to block 845, where the downstream nodes begin decrypting data from the upstream site using only the new key. The method 800 then returns to block 805 when the downstream Controller 110 receives another new key.

Figure 9:
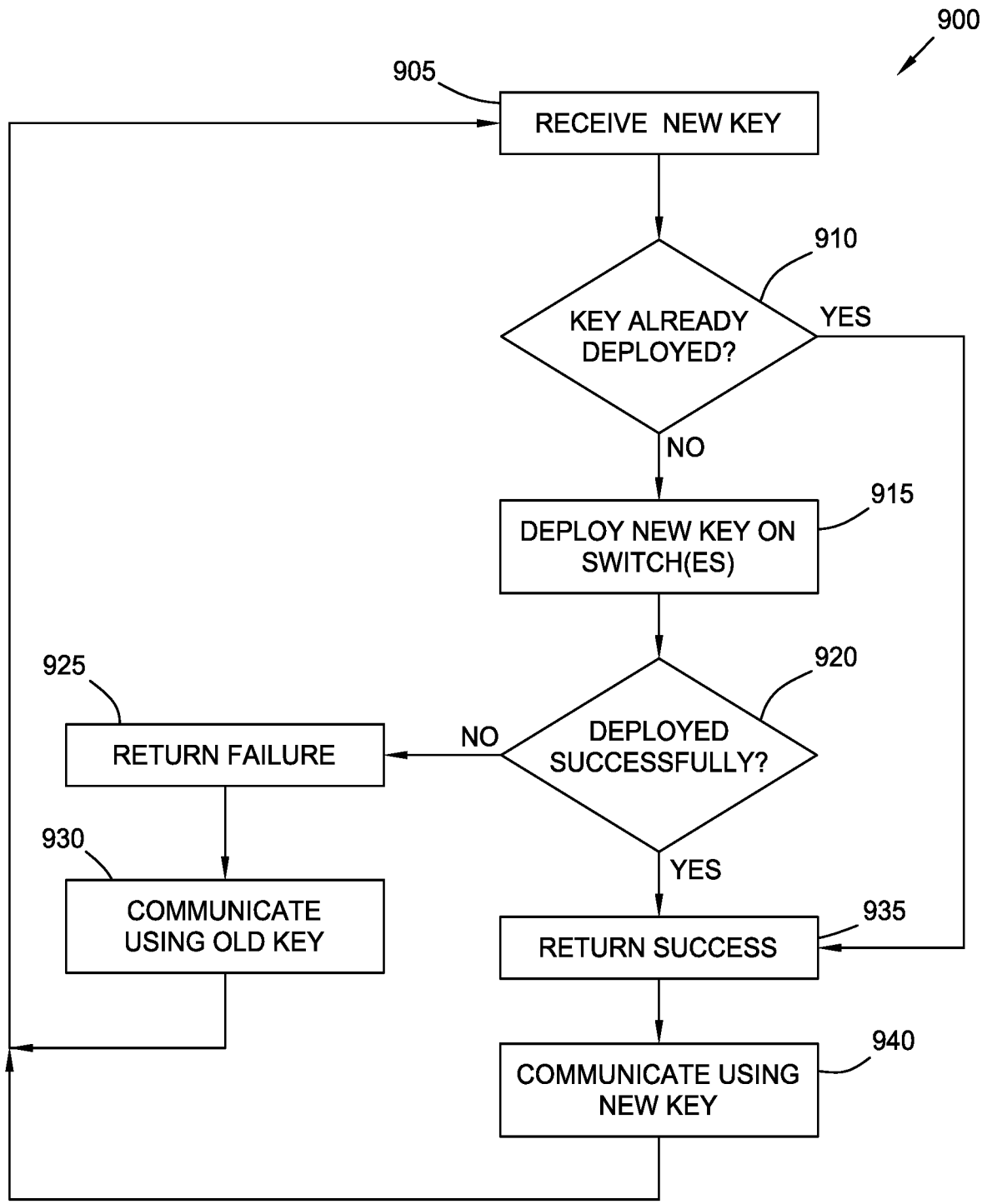
FIG. 9 is a flow diagram illustrating a method of key deployment, according to one embodiment disclosed herein.

FIG. 9 is a flow diagram illustrating a method 900 of key deployment, according to one embodiment disclosed herein. The method 900 begins at block 905, where the Controller 110 receives a new key from a remote controller responsible for a different site. The method 900 then continues to block 910, where the Controller 110 determines whether the indicated key has already been deployed at its local nodes. If so, this indicates that the acknowledgment or indication of success was not received by the other controller. In such a case, the method 900 proceeds to block 935, where the Controller 110 again transmits an indication of successful deployment to the other site. The method 900 then proceeds to block 940, where the local site continues to encrypt and transmit packets to the other site using the new key.

If, at block 910, the Controller 110 determines that the key has not already been deployed, the method 900 proceeds to block 915 where the Controller 110 deploys this new key to its local switches at the site. That is, the Controller 110 identifies the interfaces used to transmit data to the site from which the new key was received, and deploys the new key to those identified interfaces. At block 920, the Controller 110 determines whether the new key was successfully implemented. If not (e.g., if the rekey failed for at least one switch or interface), the method 900 proceeds to block 925, there the Controller 110 returns an indication of failure to the other remote controller. In some embodiments, the Controller 110 can attempt the rekey one or more additional times, prior to transmitting the indication of failure. Further, in some embodiments, the Controller 110 refrains from transmitting any acknowledgement until the new key is successfully deployed. The method 900 then continues to block 930, where the site encrypts and transmits data to the other site using the old key. This continues until the method 900 returns to block 905, when the Controller 110 receives another new key from the controller of the other site, or until the new key is successfully deployed.

If, however, the Controller 110 determines, at block 920, that the rekey was successful, the method 900 proceeds to block 935, where the Controller 110 returns an indication of successful rekey to the other controller. The method 900 then continues to block 940, where the local site begins encrypting packets destined for the remote site using the new key. In some embodiments, however, the local site encrypts all outgoing packets using the old key, until a predefined window of time has passed or until a confirmation is received from the other site. In this way, the system avoids transmitting packets encrypted with the new key to the other site, until the other site has implemented the new key. In some embodiments, however, the new key is used, and the packets are cached at the other site until the new key is implemented. The method 900 then returns to block 905 when the Controller 110 receives another new key.

Figure 10:
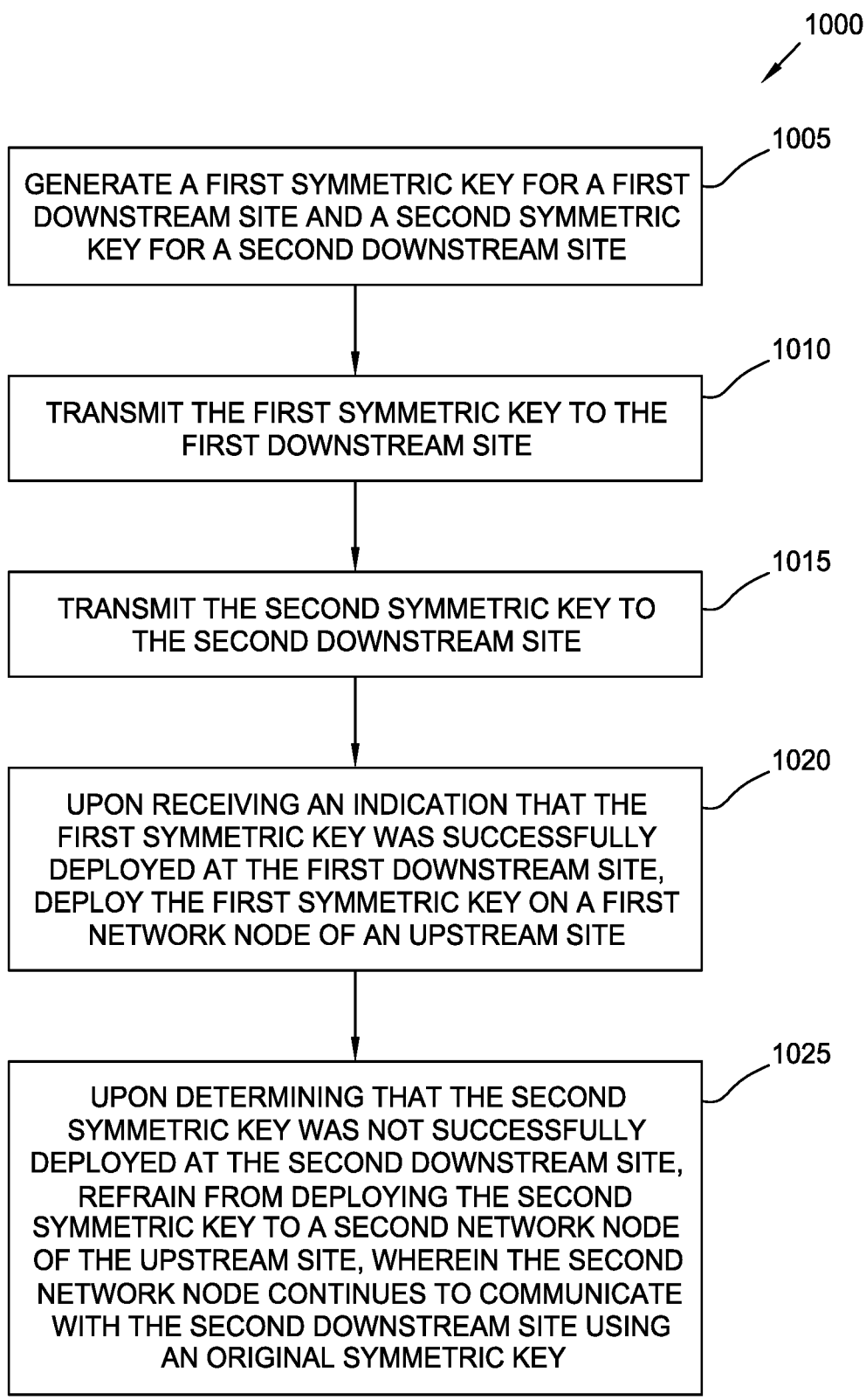
FIG. 10 is a flow diagram illustrating a method of key distribution and deployment, according to one embodiment disclosed herein.

FIG. 10 is a flow diagram illustrating a method 1000 of key distribution and deployment, according to one embodiment disclosed herein. The method 1000 begins at block 1005, where a controller of an upstream site generates a first symmetric key for a first downstream site and a second symmetric key for a second downstream site. The method 1000 then continues to block 1010, where the controller transmits the first symmetric key to the first downstream site. Further, at block 1015, the controller transmits the second symmetric key to the second downstream site. The method 1000 proceeds to block 1020, where, upon receiving an indication that the first symmetric key was successfully deployed at the first downstream site, the controller deploys the first symmetric key on a first network node of the upstream site. Finally, the method 1000 continues to block 1025, where, upon determining that the second symmetric key was not successfully deployed at the second downstream site, the controller refrains from deploying the second symmetric key to a second network node of the upstream site, wherein the second network node continues to communicate with the second downstream site using an original symmetric key.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or devices (e.g., Controllers 110, Multisite Controllers 120, Switches 115, workloads, virtual machines, applications, and the like) or related data available in the cloud. For example, the Encryption Application 230 could execute on a computing system in the cloud and maintain key distributions across multiple sites. In such a case, the Encryption Application 230 could generate unique keys for each downstream site, and store the keys and association numbers at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
generating a first symmetric key for a first downstream site, wherein the first symmetric key is specific to the first downstream site;
generating a second symmetric key for a second downstream site, wherein the second symmetric key is specific to the second downstream site;
transmitting the first symmetric key to the first downstream site;
transmitting the second symmetric key to the second downstream site;
upon receiving an indication that the first symmetric key was successfully deployed at the first downstream site, deploying the first symmetric key on a first network node of an upstream site; and
upon determining that the second symmetric key was not successfully deployed at the second downstream site, refraining from rekeying a second network node of the upstream site based on the second symmetric key, wherein the second network node continues to communicate with the second downstream site using an original symmetric key.

2. The method of claim 1, the method further comprising:
generating a third symmetric key for the first downstream site;
deploying the third symmetric key on the first network node of the upstream site;
upon determining that the third symmetric key was successfully deployed on the first network node of the upstream site, transmitting the third symmetric key to the first downstream site; and
upon determining that an acknowledgment has not been received from the first downstream site, retransmitting the third symmetric key to the first downstream site.

3. The method of claim 1, wherein the first and second symmetric keys are transmitted to a multisite controller using a key encryption key (KEK) associated with the upstream site, and wherein the multisite controller:
decrypts the first and second symmetric keys using the KEK associated with the upstream site;
encrypts the first symmetric key using a KEK associated with the first downstream site;
encrypts the second symmetric key using a KEK associated with the second downstream site; and
forwards the encrypted first and second symmetric keys to the first and second downstream sites, respectively.

4. The method of claim 1, wherein prior to transmitting the first symmetric key to the first downstream site, the first network node communicated with the first downstream site using a third symmetric key, and wherein after deploying the first symmetric key on the first network node, the first network node communicates with the first downstream site using the first symmetric key.

5. The method of claim 4, wherein, upon deploying the first symmetric key on the first downstream site, the first downstream site decrypts packets received from the upstream site using the first and the third symmetric keys for a predefined period of time, and wherein, upon determining that the predefined period of time has passed, the first downstream site decrypts packets received from the upstream site using only the first symmetric key.

6. The method of claim 1, the method further comprising:
associating a first association number (AN) with the first symmetric key;
transmitting the first AN to the first downstream site; and
upon receiving the indication that the first symmetric key was successfully deployed at the first downstream site, marking the first AN as in use.

7. The method of claim 6, the method further comprising:
associating a second AN with the second symmetric key;
transmitting the second AN to the second downstream site; and
upon receiving the indication that the second symmetric key was not successfully deployed at the second downstream site, marking the first AN as available.

8. The method of claim 6, wherein the first network node communicates with the first downstream site by:
encrypting a first communication using the first symmetric key;
associating the first AN with the first communication; and
transmitting the first communication to the first downstream site.

9. A network controller comprising:
one or more computer processors; and
a memory containing a program which when executed by the one or more computer processors performs an operation, the operation comprising:
generating a first symmetric key for a first downstream site, wherein the first symmetric key is specific to the first downstream site;
generating a second symmetric key for a second downstream site, wherein the second symmetric key is specific to the second downstream site;
transmitting the first symmetric key to the first downstream site;
transmitting the second symmetric key to the second downstream site;
upon receiving an indication that the first symmetric key was successfully deployed at the first downstream site, deploying the first symmetric key on a first network node of an upstream site; and
upon determining that the second symmetric key was not successfully deployed at the second downstream site, refraining from rekeying a second network node of the upstream site based on the second symmetric key, wherein the second network node continues to communicate with the second downstream site using an original symmetric key.

10. The network controller of claim 9, the operation further comprising:

generating a third symmetric key for the first downstream site;

deploying the third symmetric key on the first network node of the upstream site;

upon determining that the third symmetric key was successfully deployed on the first network node of the upstream site, transmitting the third symmetric key to the first downstream site; and upon determining that an acknowledgment has not been received from the first downstream site, retransmitting the third symmetric key to the first downstream site.

11. The network controller of claim 9, wherein the first and second symmetric keys are transmitted to a multisite controller using a key encryption key (KEK) associated with the upstream site, and wherein the multisite controller:

decrypts the first and second symmetric keys using the KEK associated with the upstream site;

encrypts the first symmetric key using a KEK associated with the first downstream site;

encrypts the second symmetric key using a KEK associated with the second downstream site; and forwards the encrypted first and second symmetric keys to the first and second downstream sites, respectively.

12. The network controller of claim 9, wherein prior to transmitting the first symmetric key to the first downstream site, the first network node communicated with the first downstream site using a third symmetric key, wherein, upon deploying the first symmetric key on the first downstream site, the first downstream site decrypts packets received from the upstream site using the first and the third symmetric keys for a predefined period of time, and wherein, upon determining that the predefined period of time has passed, the first downstream site decrypts packets received from the upstream site using only the first symmetric key.

13. The network controller of claim 9, the operation further comprising:

associating a first association number (AN) with the first symmetric key;

transmitting the first AN to the first downstream site; and upon receiving the indication that the first symmetric key was successfully deployed at the first downstream site, marking the first AN as in use.

14. The network controller of claim 13, the operation further comprising:

associating a second AN with the second symmetric key;

transmitting the second AN to the second downstream site; and upon receiving the indication that the second symmetric key was not successfully deployed at the second downstream site, marking the first AN as available.

15. The network controller of claim 13, wherein the first network node communicates with the first downstream site by:

encrypting a first communication using the first symmetric key;

associating the first AN with the first communication; and transmitting the first communication to the first downstream site.

16. A computer product comprising logic encoded in a non-transitory medium, the logic executable by operation of one or more computer processors to perform an operation comprising:

generating a first symmetric key for a first downstream site, wherein the first symmetric key is specific to the first downstream site;

generating a second symmetric key for a second downstream site, wherein the second symmetric key is specific to the second downstream site;

transmitting the first symmetric key to the first downstream site;

transmitting the second symmetric key to the second downstream site;

upon receiving an indication that the first symmetric key was successfully deployed at the first downstream site, deploying the first symmetric key on a first network node of an upstream site; and upon determining that the second symmetric key was not successfully deployed at the second downstream site, refraining from rekeying a second network node of the upstream site based on the second symmetric key, wherein the second network node continues to communicate with the second downstream site using an original symmetric key.

17. The computer product of claim 16, the operation further comprising:

generating a third symmetric key for the first downstream site;

deploying the third symmetric key on the first network node of the upstream site;

upon determining that the third symmetric key was successfully deployed on the first network node of the upstream site, transmitting the third symmetric key to the first downstream site; and upon determining that an acknowledgment has not been received from the first downstream site, retransmitting the third symmetric key to the first downstream site.

18. The computer product of claim 16, wherein the first and second symmetric keys are transmitted to a multisite controller using a key encryption key (KEK) associated with the upstream site, and wherein the multisite controller:

decrypts the first and second symmetric keys using the KEK associated with the upstream site;

encrypts the first symmetric key using a KEK associated with the first downstream site;

encrypts the second symmetric key using a KEK associated with the second downstream site; and forwards the encrypted first and second symmetric keys to the first and second downstream sites, respectively.

19. The computer product of claim 16, the operation further comprising:

associating a first association number (AN) with the first symmetric key;

transmitting the first AN to the first downstream site; and upon receiving the indication that the first symmetric key was successfully deployed at the first downstream site, marking the first AN as in use.

20. The computer product of claim 19, the operation further comprising:

associating a second AN with the second symmetric key;

transmitting the second AN to the second downstream site; and upon receiving the indication that the second symmetric key was not successfully deployed at the second downstream site, marking the first AN as available.

* * * * *

UNITED STATES PATENT AND TRADEMARK OFFICE
CERTIFICATE OF CORRECTION

PATENT NO. : 11,290,436 B2
APPLICATION NO. : 16/249785
DATED : March 29, 2022
INVENTOR(S) : Dave Persaud et al.

It is certified that error appears in the above-identified patent and that said Letters Patent is hereby corrected as shown below:

On the Title Page

On the page 2, in item (56), in Column 2, under "Other Publications", Line 7, delete "Distriubted Secuirty Architecuture" and insert -- Distributed Security Architecture --.

On the page 2, in item (56), in Column 2, under "Other Publications", Line 8, delete "Onine" and insert -- Online --.

In the Specification

In Column 4, Line 15, delete "1106," and insert -- 11 OB, --.

In Column 4, Line 48, delete "1158" and insert -- 115B --.

In Column 4, Line 52, delete "1058" and insert -- 105B --.

In Column 4, Line 54, delete "1158" and insert -- 115B --.

In Column 4, Line 57, delete "1058" and insert -- 105B --.

In Column 5, Line 22, delete "1108" and insert -- 11 OB --.

In Column 5, Line 29, delete "1108" and insert -- 11 OB --.

In Column 5, Line 31, delete "1108" and insert -- 11 OB --.

In Column 8, Line 39, delete "1106" and insert -- 11 OB --.

In Column 8, Line 40, delete "1056," and insert -- 105B, --.

Signed and Sealed this
Fifth Day of July, 2022

Katherine Kelly Vidal
*Director of the United States Patent and Trademark Office*

In Column 8, Line 45, delete "1108" and insert -- 11 OB --.

In Column 8, Line 49, delete "1108" and insert -- 11 OB --.

In Column 8, Line 51, delete "1108" and insert -- 11 OB --.

In Column 8, Line 54, delete "1108" and insert -- 11 OB --.

In Column 8, Line 64, delete "1108" and insert -- 11 OB --.

In Column 9, Line 3, delete "1108" and insert -- 11 OB --.

In Column 9, Line 8, delete "1108" and insert -- 11 OB --.

In Column 9, Line 16, delete "1106" and insert -- 11 OB --.

In Column 9, Line 28, delete "1106" and insert -- 11 OB --.

In Column 10, Line 17, delete "1106" and insert -- 11 OB --.

In Column 10, Line 21, delete "1106" and insert -- 11 OB --.

In Column 10, Line 26, delete "1056" and insert -- 105B --.

In Column 10, Line 38, delete "1056" and insert -- 105B --.

In Column 11, Line 55, delete "1056" and insert -- 105B --.

In Column 11, Line 64, delete "1106," and insert -- 11 OB, --.

In Column 11, Line 67, delete "1106." and insert -- 11 OB. --.

In Column 12, Line 11, delete "1106" and insert -- 11 OB --.

In Column 12, Line 15, delete "1106" and insert -- 11 OB --.

In Column 12, Line 17, delete "1106" and insert -- 11 OB --.

In Column 12, Line 20, delete "1106" and insert -- 11 OB --.

In Column 12, Line 23, delete "1106" and insert -- 11 OB --.

In Column 12, Line 26, delete "1106" and insert -- 11 OB --.

In Column 12, Line 29, delete "K1 ," and insert -- K1. --.

In Column 12, Line 35, delete "1106" and insert -- 11 OB --.

In Column 12, Line 44, delete "1106" and insert -- 11 OB --.

In Column 12, Line 49, delete "1106" and insert -- 11 OB --.

In Column 12, Line 56, delete "1156" and insert -- 115B --.

In Column 13, Line 8, delete "1156" and insert -- 115B --.

In Column 13, Line 17, delete "1056" and insert -- 105B --.

In Column 13, Line 37, delete "1106" and insert -- 11 OB --.

In Column 13, Line 42, delete "1106" and insert -- 11 OB --.

In Column 13, Line 46, delete "1106" and insert -- 11 OB --.

In Column 13, Line 49, delete "1106" and insert -- 11 OB --.

In Column 13, Line 51, delete "1106" and insert -- 11 OB --.

In Column 13, Line 62, delete "1156" and insert -- 115B --.

In Column 14, Line 35, delete "1106" and insert -- 11 OB --.

In Column 14, Line 39, delete "1056" and insert -- 105B --.

In Column 15, Line 62, delete "1056." and insert -- 105B. --.

In Column 16, Line 14, delete "1106," and insert -- 11 OB, --.

In Column 16, Line 17, delete "1106." and insert -- 11 OB. --.

In Column 16, Line 44, delete "1106." and insert -- 11 OB. --.

In Column 16, Line 47, delete "1106." and insert -- 11 OB. --.

In Column 16, Line 49, delete "1106," and insert -- 11 OB, --.

In Column 16, Line 53, delete "1106." and insert -- 11 OB. --.

In Column 16, Line 53, delete "1106" and insert -- 11 OB --.

In Column 16, Line 57, delete "1106" and insert -- 11 OB --.

CERTIFICATE OF CORRECTION (continued)
U.S. Pat. No. 11,290,436 B2

In Column 16, Line 59, delete "1106" and insert -- 11 OB --.

In Column 16, Line 62, delete "1106" and insert -- 11 OB --.

In Column 17, Line 29, delete "success," and insert -- success. --.

In Column 17, Line 50, delete "1156" and insert -- 115B --.

In Column 17, Line 59, delete "1056" and insert -- 105B --.

In Column 17, Line 63, delete "1106" and insert -- 11 OB --.

In Column 18, Line 1, delete "1106" and insert -- 11 OB --.

In Column 18, Line 6, delete "1056" and insert -- 105B --.

In Column 18, Line 7, delete "1056," and insert -- 105B, --.